(12) United States Patent
Gopal et al.

(10) Patent No.: US 9,473,578 B2
(45) Date of Patent: Oct. 18, 2016

(54) SYSTEM AND ARCHITECTURE FOR SPACE-BASED AND MOBILE TERRESTRIAL SENSOR VEHICLES, AND END-TO-END NETWORK FOR AGGREGATION AND PROCESSING OF SENSOR DATA

(71) Applicant: Hughes Network Systems, LLC, Germantown, MD (US)

(72) Inventors: Rajeev Gopal, North Potomac, MD (US); Stanley Kay, Rockville, MD (US); James Lykins, Darnestown, MD (US); Channasandra Ravishankar, Germantown, MD (US); Yash Vasavada, Gaithersburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 14/337,159

(22) Filed: Jul. 21, 2014

(65) Prior Publication Data

US 2015/0024677 A1    Jan. 22, 2015

Related U.S. Application Data

(60) Provisional application No. 61/856,753, filed on Jul. 21, 2013.

(51) Int. Cl.
*H04B 7/185* (2006.01)
*H04W 36/00* (2009.01)
(Continued)

(52) U.S. Cl.
CPC ........... *H04L 67/12* (2013.01); *H04B 7/18515* (2013.01); *H04B 7/2041* (2013.01); *H04W 40/36* (2013.01); *H04L 63/20* (2013.01); *H04W 84/18* (2013.01)

(58) Field of Classification Search
CPC ........... H04B 7/0408; H04B 7/18513; H04B 7/18515; H04B 7/18521; H04B 7/18541; H04B 7/18578; H04B 7/2041; H04W 40/36; H04W 72/042; H04W 72/046

USPC .............. 455/7, 11.1, 12.1, 13.1, 427, 450, 455/452.1, 436, 440; 370/331
See application file for complete search history.

(56) References Cited

U.S. PATENT DOCUMENTS 5,561,838 A    10/1996  Chandos et al.
5,634,190 A  *  5/1997  Wiedeman ........... H04B 7/1856
                                                         455/12.1
(Continued)

OTHER PUBLICATIONS

USPTO, "International Search Report & Written Opinion", PCT/US2014/047496, Oct. 17, 2014.
(Continued)

*Primary Examiner* — Quochien B Vuong
(74) *Attorney, Agent, or Firm* — Potomac Technology Law, LLC

(57) ABSTRACT

A system is provided for reducing latency data collection from space-based sensor satellites. A mobile vehicle platform includes a sensor module configured to monitor certain conditions, circumstances, environments and situations occurring on or around, or associated with, the Earth, and to generate sensor data resulting from the monitoring. A relay satellite terminal is configured to execute data communications via a communications channel of a first satellite beam, wherein the data communications are configured to relay the sensor data, via satellites, to respective gateways for forwarding to a central processing facility for one or more of aggregation, processing, analysis and dissemination of the data. The relay satellite terminal is further configured to switch the data communications from the communications channel of the first satellite beam to a communications channel of a second satellite beam based on a position of the relay satellite terminal relative to the first and second satellite beams.

7 Claims, 14 Drawing Sheets

(51) Int. Cl.
*H04L 29/08* (2006.01)
*H04W 40/36* (2009.01)
*H04B 7/204* (2006.01)
*H04W 84/18* (2009.01)
*H04L 29/06* (2006.01)

(56) References Cited

U.S. PATENT DOCUMENTS

| | | | |
|---|---|---|---|
| 5,652,717 | A | 7/1997 | Miller et al. |
| 5,999,127 | A | 12/1999 | Dezelan |
| 6,002,916 | A | 12/1999 | Lynch |
| 6,023,605 | A | 2/2000 | Sasaki et al. |
| 6,208,858 | B1 * | 3/2001 | Antonio ............ H04B 7/18534 455/12.1 |
| 6,678,520 | B1 * | 1/2004 | Wang ................ H04B 7/18513 455/13.1 |
| 8,300,598 | B2 * | 10/2012 | Kim .................... H04W 36/26 370/328 |
| 8,401,466 | B2 * | 3/2013 | Bidigare ............ H04B 7/18513 455/12.1 |
| 2004/0185776 | A1 | 9/2004 | Wang et al. |
| 2005/0151006 | A1 | 7/2005 | Krill et al. |
| 2007/0085735 | A1 | 4/2007 | Bay |
| 2008/0170536 | A1 | 7/2008 | Marshack et al. |
| 2009/0156219 | A1 | 6/2009 | Kim et al. |
| 2011/0188586 | A1 | 8/2011 | Bidigare et al. |
| 2012/0184208 | A1 | 7/2012 | Renouard et al. |

OTHER PUBLICATIONS

USPTO, "International Search Report & Written Opinion", App. No. PCT/US2014/047110, Sep. 30, 2014.

* cited by examiner

SYSTEM AND ARCHITECTURE FOR SPACE-BASED AND MOBILE TERRESTRIAL SENSOR VEHICLES, AND END-TO-END NETWORK FOR AGGREGATION AND PROCESSING OF SENSOR DATA

RELATED APPLICATIONS

This application claims the benefit of the earlier filing date under 35 U.S.C. §119(e) of U.S. Provisional Application Ser. No. 61/856,753 (filed 2013 Jul. 21).

BACKGROUND

Space and Earth monitoring has become a powerful tool for such applications as scientific research and monitoring (e.g., environment and agriculture research and monitoring), weather and natural disaster prediction and monitoring, and global activity monitoring for defense purposes. Space-based (e.g., satellite-based) sensor networks are increasingly being relied on as a powerful technology for such space and Earth monitoring applications. For example, earth and space monitoring missions may encompass a number of small satellites (e.g., satellites of a mass of a few kilograms, or even some which may be of a mass of less than one kilogram), flying in a controlled formation or forming a constellation covering target areas. Typically, such small satellite fleets are deployed as low earth orbit (LEO) satellites which circle the earth in orbits below an altitude of approximately 2,000 kilometers or 1,200 miles, and make one complete revolution around the Earth in about 90 minutes. LEO satellites require less energy to be placed into orbit, and require less powerful amplifiers (e.g., than satellites in geosynchronous orbit at an altitude of approximately 35,786 km or 22,236 miles) for successful transmission.

In such LEO monitoring systems, the satellites travel through their orbits collecting and storing sensor data. In order to deliver the collected data, the satellite must first get into a position where you can communicate with a ground station equipped to deliver the data back to the target facility for processing. While the satellites are traveling through an orbit, however, they cannot always be in contact with a ground station to which they can transfer the collected data. In order to minimize the number of required ground stations, typical systems will deploy the ground stations either near the North Pole or the South Pole, where there is access to many of the LEO satellite orbits. Accordingly, between periods where the satellite is able to contact the ground station upwards of an hour must pass for the satellite to complete an orbit and reach the ground station again. Hence, the sensor satellites experience significant delays between the time data may be collected and the time that the date is able to be delivered to the ground station and on to the target facility for processing. Obviously, especially in situations where real-time data is being collected and analysis similarly should be performed in real time (e.g., in the case of monitoring for severe weather and potential natural disasters, or in the case of monitoring activities that may involve defensive responses), such delays can be detrimental to the efficacy of the monitoring system itself. One solution might be to increase the number of ground stations around the globe, however, that would significantly increase the cost of such systems and would render the logistics of deploying and operating such systems impractical at best and more likely unfeasible.

Additionally, today such LEO satellite-based sensor network systems are deployed as specialized systems consisting of a dedicated infrastructure for each system or mission. As such, each system comprises its own LEO sensing satellites, dedicated ground stations or gateways, dedicated aggregation facilities and dedicated processing facilities. This architecture makes such systems expensive to deploy and maintain. Further, such architectures prevent the ability to utilize common facilities across multiple different space-based sensing systems, and thereby prevent the ability to scale such systems and take advantage of economies of scale. For example, a particular weather sensing system will comprise a fleet of dedicated LEO weather sensing satellites, dedicated gateways for receiving the monitor data from such satellites, and dedicated systems and respective facilities for aggregating, processing and analyzing the gathered data.

What is needed, therefore, is a system architecture and approach to address the challenges of reducing the latency involved in collecting data from space-based sensor satellites, and consolidating the aggregation and processing of data from multiple systems in a general-purpose architecture in order to provide a scalable and more efficient end-to-end (E2E) processing architecture.

SOME EXAMPLE EMBODIMENTS

The present invention advantageously addresses the foregoing requirements and needs, as well as others, by providing a system architecture and approach that significantly reduces the latency involved in collecting data from space-based sensor satellites, and providing an end-to-end (E2E) system for consolidating the aggregation and processing of data from multiple systems in a general-purpose architecture.

In accordance with example embodiments, an apparatus comprises a mobile vehicle platform, including a sensor module configured to monitor one or more of certain conditions, circumstances, environments and situations occurring on or around, or associated with, the Earth, and to generate sensor data resulting from the monitoring. The apparatus further comprises a relay satellite terminal, mounted on the mobile vehicle platform, configured to execute data communications via a communications channel of a first satellite beam, wherein the data communications are configured to relay the sensor data, via one or more satellites with which it executes the data communications, to one or more respective gateways for forwarding to a central processing facility for one or more of aggregation, processing, analysis and dissemination of the data. The relay satellite terminal is further configured to switch the data communications from the communications channel of the first satellite beam to a communications channel of a second satellite beam based on a position of the relay satellite terminal relative to the first and second satellite beams. According to a further embodiment, the apparatus further comprises a buffer module configured to buffer the sensor data during a period of time while the relay satellite terminal is executing the switch of the data communications from the communications channel of the first satellite beam to the communications channel of the second satellite beam.

By way of example, the communications channel of the first satellite beam and the communications channel of the second satellite beam may both be associated with a one of the one or more gateways. In that context, according to one embodiment, in switching the data communications from the communications channel of the first satellite beam to the communications channel of the second satellite beam the relay satellite terminal performs certain functions. The relay terminal determines that it should perform the switch based on the position of the relay satellite terminal relative to the first and second satellite beams, transmits a channel request message to the one gateway, and receive a channel assignment response message from the one gateway, terminates the data communications via the communications channel of the first satellite beam, and tunes to the communications channel of the second satellite beam in accordance with the channel assignment message, and resume the data communications via the communications channel of the second satellite beam. In that same context, according to a further embodiment, in switching the data communications from the communications channel of the first satellite beam to the communications channel of the second satellite beam, the relay satellite terminal performs certain functions. The relay terminal receives a channel handover command message from the one gateway, terminates the data communications via the communications channel of the first satellite beam, tunes to the communications channel of the second satellite beam in accordance with the handover command message, and resume the data communications via the communications channel of the second satellite beam, and transmits a handover complete message to the one gateway.

By way of further example, the communications channel of the first satellite beam may be associated with a first of the one or more gateways, while the communications channel of the second satellite beam may be associated with a second of the one or more gateways. In that context, according to one embodiment, in switching the data communications from the communications channel of the first satellite beam to the communications channel of the second satellite beam, the relay satellite terminal performs certain functions. The relay terminal receives a channel handover command message from the first gateway, terminates the data communications via the communications channel of the first satellite beam, tunes to the communications channel of the second satellite beam in accordance with the handover command message, and transmit a handover complete message to the second gateway, and resumes the data communications via the communications channel of the second satellite beam.

In accordance with further example embodiments, a method comprises monitoring, via a sensor disposed on a mobile vehicle platform, one or more of certain conditions, circumstances, environments and situations occurring on or around, or associated with, the Earth, while the mobile vehicle platform travels around the Earth. The method also comprises generating sensor data resulting from the monitoring, and executing data communications, via a relay satellite terminal, over a communications channel of a first satellite beam, wherein the data communications are configured to relay the sensor data, via one or more satellites with which it executes the data communications, to one or more respective gateways for forwarding to a central processing facility for one or more of aggregation, processing, analysis and dissemination of the data. The method further comprises switching the data communications from the communications channel of the first satellite beam to a communications channel of a second satellite beam based on a position of the relay satellite terminal relative to the first and second satellite beams. According to a further embodiment, the method also comprises buffering the sensor data during a period of time of the switching of the data communications from the communications channel of the first satellite beam to the communications channel of the second satellite beam.

By way of example, the communications channel of the first satellite beam and the communications channel of the second satellite beam may both be associated with a one of the one or more gateways. In that context, according to one embodiment, in switching the data communications from the communications channel of the first satellite beam to the communications channel of the second satellite beam, the method further comprises determining to switch the communications from the communications channel of the first satellite beam to the communications channel of the second satellite beam based on the position of the relay satellite terminal relative to the first and second satellite beams; transmitting a channel request message to the one gateway, and receiving a channel assignment response message from the one gateway; terminating the data communications via the communications channel of the first satellite beam; tuning to the communications channel of the second satellite beam in accordance with the channel assignment message, and resuming the data communications via the communications channel of the second satellite beam. In that same context, according to a further embodiment, in switching the data communications from the communications channel of the first satellite beam to the communications channel of the second satellite beam, the method further comprises receiving a channel handover command message from the one gateway; terminating the data communications via the communications channel of the first satellite beam; tuning to the communications channel of the second satellite beam in accordance with the handover command message, and resuming the data communications via the communications channel of the second satellite beam; and transmitting a handover complete message to the one gateway.

By way of further example, the communications channel of the first satellite beam may be associated with a first of the one or more gateways, while the communications channel of the second satellite beam may be associated with a second of the one or more gateways. In that context, according to one embodiment, in switching the data communications from the communications channel of the first satellite beam to the communications channel of the second satellite beam, the method further comprises receiving a channel handover command message from the first gateway; terminating the data communications via the communications channel of the first satellite beam; tuning to the communications channel of the second satellite beam in accordance with the handover command message, and transmitting a handover complete message to the second gateway; and resuming the data communications via the communications channel of the second satellite beam.

In accordance with further example embodiments, a system comprises a mobile vehicle platform. The mobile vehicle platform includes a sensor module configured to monitor one or more of certain conditions, circumstances, environments and situations occurring on or around, or associated with, the Earth, and to generate sensor data resulting from the monitoring. The mobile vehicle platform further includes a relay satellite terminal configured to execute data communications via a communications channel of a first satellite beam, wherein the data communications are configured to relay the sensor data, via one or more satellites with which it executes the data communications, to one or more respective gateways for forwarding to a central processing facility for one or more of aggregation, processing, analysis and dissemination of the data, and wherein the relay satellite terminal is further configured to switch the data communications from the communications channel of the first satellite beam to a communications channel of a second satellite beam. The system further comprises a first gateway associated with the communications channel of the first satellite beam, and a second gateway associated with the communications channel of the second satellite beam. The relay satellite terminal is further configured to transmit periodic position messages to the first gateway. The first gateway is configured to determine to switch the communications from the communications channel of the first satellite beam to the communications channel of the second satellite beam based on the position messages and a position of the relay satellite terminal relative to the first and second satellite beams, and, upon making that determination, to transmit a handover request message to the second gateway. The second gateway is configured to transmit a handover acknowledgement message to the first gateway in response to the handover request message. The first gateway is further configured to transmit a handover command message to the relay satellite terminal upon receipt of the handover acknowledgement message. The relay satellite terminal is further configured to, upon receipt of the handover command message, terminate the data communications via the communications channel of the first satellite beam, tune to the communications channel of the second satellite beam in accordance with the handover command message, transmit a handover complete message to the second gateway, and resume the data communications via the communications channel of the second satellite beam.

According to a further embodiment, the system further comprises an anchor gateway. The first gateway is further configured to, upon receiving the handover acknowledgment message from the second gateway, forward the sensor data to the anchor gateway. The second gateway is further configured to, upon receiving the handover compete message from the relay satellite terminal, transmit a handover complete message to the first gateway, and transmit a route update message to the anchor gateway. The anchor gateway is configured to, upon receiving the route update message from the second gateway, transmit the sensor data forwarded by the first gateway to the second gateway. According to a further embodiment, the mobile vehicle platform further includes a control module and a buffer module. During a period of time between the termination of the data communications via the communications channel of the first satellite beam and the resumption of the data communications via the communications channel of the second satellite beam, the control module is configured to store the sensor data in the buffer module. The control module is configured to, upon the resumption of the data communications via the communications channel of the second satellite beam, provide the buffered data to the relay satellite terminal for transmission to the second gateway.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A system architecture and approach that significantly reduces the latency involved in collecting data from space-based sensor satellites, and providing an end-to-end (E2E) system for consolidating the aggregation and processing of data from multiple systems in a general-purpose architecture, is described. In the following description, for the purposes of explanation, numerous specific details are set forth in order to provide a thorough understanding of the invention. It is apparent, however, that the invention may be practiced without these specific details or with an equivalent arrangement. In other instances, well known structures and devices are shown in block diagram form in order to avoid unnecessarily obscuring the invention.

Figure 1A:
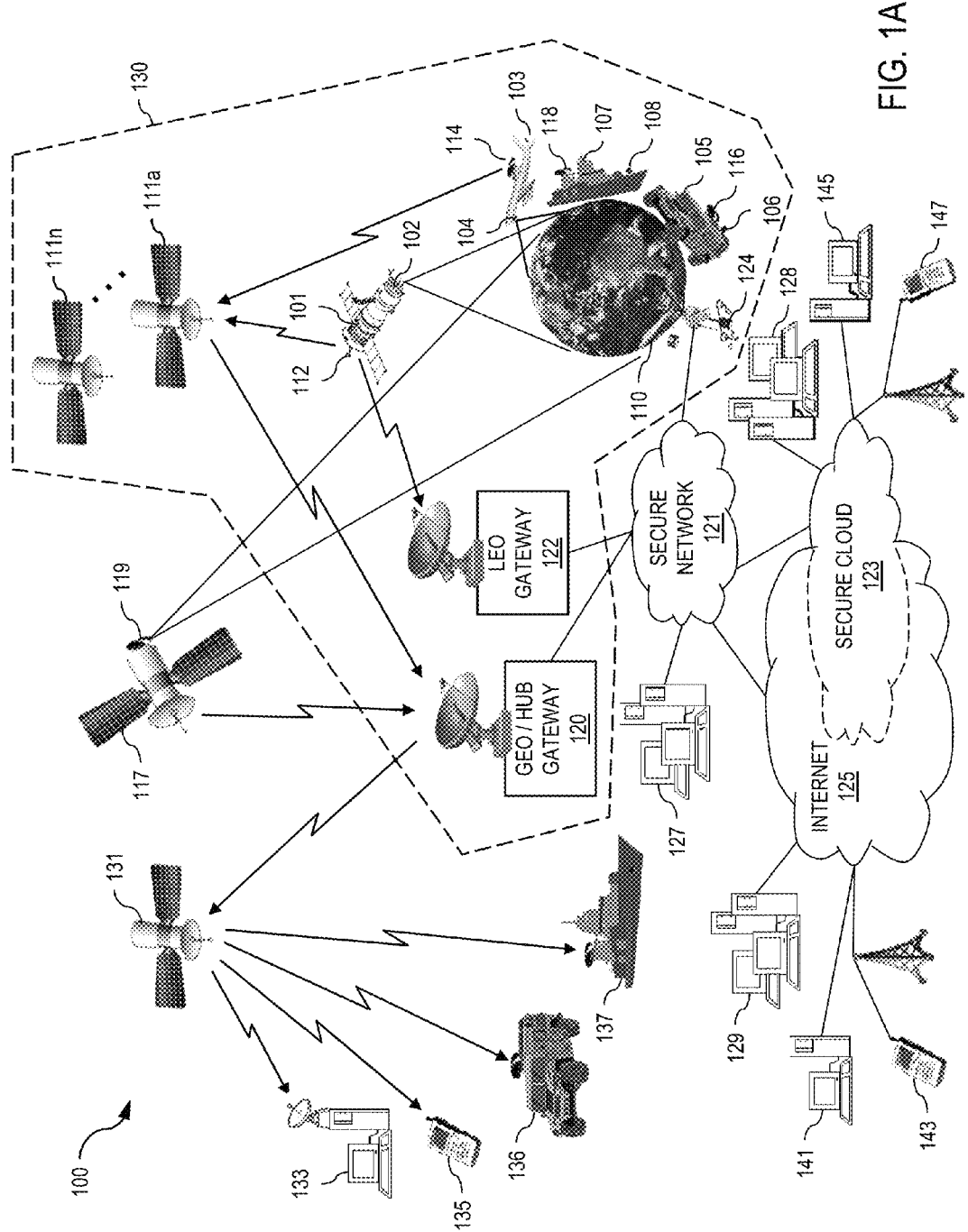
FIG. 1A illustrates an end-to-end (E2E) space-based sensor network system architecture that achieves a reduced latency in the collection of data from space-based sensors (e.g., satellite-based sensors), and a consolidation of the aggregation and processing of data from multiple systems in a general-purpose architecture, in accordance with example embodiments of the present invention.

FIG. 1A illustrates an architecture for an end-to-end (E2E) space-based sensor network system 100 that achieves a reduced latency in the collection of data from space-based sensors (e.g., satellite-based sensors), and a consolidation of the aggregation and processing of data from multiple systems in a general-purpose architecture, in accordance with example embodiments of the present invention. According to an example embodiment, the system 100 comprises one or more low earth orbit (LEO) satellites 101, each equipped with one or more sensors 102. Further, the system may also include one or more geosynchronous satellites 117, each equipped with one or more sensors 119. According to a further embodiment, the system 100 may also comprise other airborne or mobile ground-based sensors, such as aircraft 103 equipped with one or more sensors 104, mobile vehicle 105 equipped with one or more sensors 106, and ship 107 equipped with one or more sensors 108. The sensors 102, 104, 106, 108 and 119 are configured to monitor certain conditions or situations associated with the earth 110 (e.g., weather conditions, atmospheric conditions, and activities that may present a potential security threat), and store data resulting from the monitoring of such conditions or situations.

The system 100 further comprises the geosynchronous (GEO) satellites 111 (e.g., a number of geosynchronous satellites 111a to 111n). By way of example, the geosynchronous satellites 111 may comprise current and/or future commercial or government owned or operated satellites, deployed for various general broadband communications functions, such as Ku and/or Ka band communication satellites currently deployed over various locations of the earth. Further, these GEO satellites 111 may employ various air interface and packetized data communications standards, such as IPoS (IP Over Satellite—Telecommunications Industry Association, TIA-1008), DVB-S2 (European Telecommunications Standards Institute, ETSI EN-302-307). Each of the sensor vehicles, aircraft and spacecraft (e.g., the LEO 101, aircraft 103, vehicle 105 and ship 107) is further equipped with a communications relay terminal. For example, the LEO satellite 101 is equipped with relay terminal 112, the aircraft 103 is equipped with relay terminal 114, the vehicle 105 is equipped with relay terminal 116, and the ship 107 is equipped with relay terminal 118. The relay terminals are configured to communicate with the geosynchronous Earth orbit (GEO) communications satellites 111, for relaying the monitored sensor data to the ground-based GEO satellite hub/gateway(s) 120. In that regard, the relay terminals are configured much like standard very small aperture terminals (VSAT) utilized in ground-based infrastructure for communicating with such GEO communications satellites. With regard to the GEO satellite 117, because it maintains a geosynchronous orbit and is thus always in communications range with the GEO satellite hub/gateway 120, the satellite 117 can transmit its sensor data down to the GEO hub/gateway 120 effectively at any time. Alternatively, the GEO satellite 117 may transmit its sensor data to a dedicated GEO sensor gateway (not shown). Further, the system 100 may also employ one or more ground-based sensors 124, which may communicate with the ground-based network, for example, directly via the secure network 121.

Figure 1B:
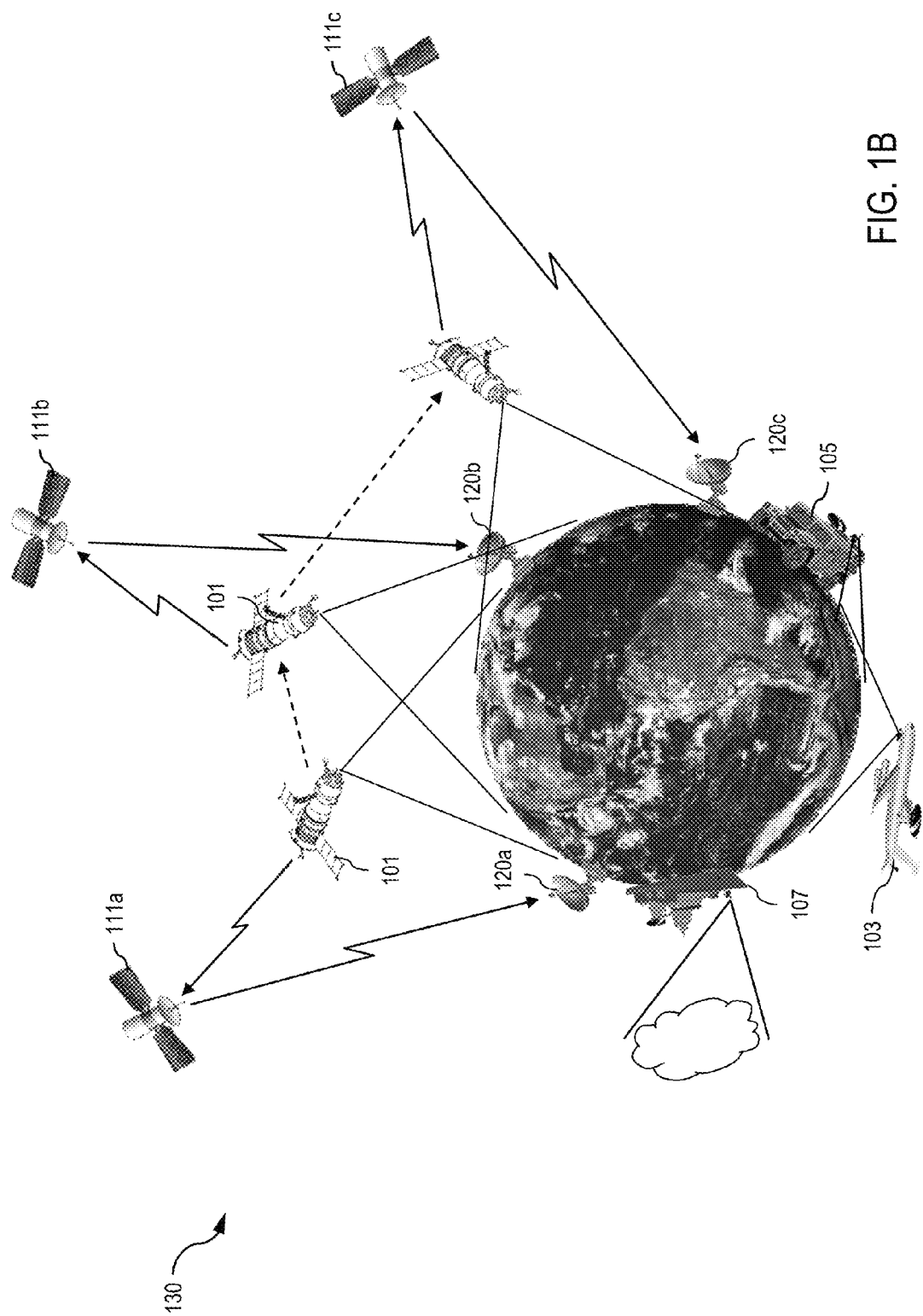
FIG. 1B illustrates an example of the data collection subsystem (the portion of the system within the dotted outline of FIG. 1A), with respect to the architecture/operation of data sensor collection via the space-based, airborne and ground-based mobile sensors, in accordance with example embodiments of the present invention.

FIG. 1B illustrates an example of the data collection subsystem 130 (the portion of the system 100 within the dotted outline of FIG. 1A), with respect to the architecture/operation of data sensor collection via the space-based, airborne and ground-based mobile sensors (e.g., satellite, aircraft, vehicle and ship), in accordance with example embodiments of the present invention. With regard to the LEO sensor satellite 101, for example, the satellite maintains a pre-programmed table (based on a priori knowledge), which identifies the available GEO communications satellite coverage around the Earth, and may further identify compatible ground-based LEO gateway locations (gateways within the system or constellation of the LEO satellite). The table may also be reconfigurable based on ground commanding, for example, to adapt to new GEO satellite availability and/or decommissioning of existing GEO satellites, etc. Further, the table may also provide information as to layers of preferred GEO satellites and/or LEO ground-based gateways within different regions around the Earth (e.g., similar to an IP-based routing table). While the LEO satellite 101 is within communications range with one of the GEO satellites 111 (e.g., 111a), the LEO satellite 101 transmits its monitored sensor data (in real-time), via the relay terminal 112, to the GEO satellite 111a, for relay down to the GEO satellite hub/gateway 120a. Then, upon transitioning from within the communications footprint of the GEO communications satellite 111a to the communications footprint of the GEO communications satellite 111b, the relay terminal 112 transitions from the satellite 111a, and switches the transmission of its real-time monitored sensor data to the satellite 111b for relay to the respective GEO satellite hub/gateway 120b. Subsequently, a similar switch occurs when the LEO sensor satellite 101 transitions from within the communications footprint of the satellite 111b to the communications footprint of the GEO communications satellites 111c (the LEO satellite 101 switches the transmission of its real-time sensor data to the satellite 111c for relay down to the GEO hub/gateway 120c). The system is further configured for similar sensor data relay to the GEO hubs/gateways 120 (via the GEO communications satellites 111) from the sensors of the aircraft 103, vehicle 105 and ship 107, and for similar transitions of the sensor data relay from one GEO satellite and hub/gateway pair (111/120) to another pair.

Further, when the LEO sensor satellite is outside of the communications range of any GEO communications satellites 111 (e.g., when over either the North or South Pole, as described in further detail below) or during a brief communications handover transition period from one GEO satellite to another, the sensor 102 buffers all monitored sensor data until the LEO satellite reaches the communications footprint of another GEO communications satellite or until the handover transition is complete. Alternatively, when the LEO satellite 101 enters the communications range of a LEO gateway 122 (e.g., a dedicated LEO sensor gateway of an existing legacy LEO sensor network—such as when the LEO sensor satellite is over the North Pole, as described in further detail below), the LEO satellite 101 may relay its stored sensor data to the LEO gateway. The LEO gateway 122, in turn, may be collocated with a data processing facility, or may be configured to pass the sensor data on to the secure network 121. The GEO satellite hubs/gateways 120a, 120b and 120c forward the received sensor data to the secure network 121 for processing/analysis and for distribution of post-processing data/information on to end-users. For example, at one point in time, the relay terminal of the LEO sensor satellite may be relaying sensor data to a GEO satellite hub/gateway in the United States, and then, 45 minutes later, the LEO satellite may be relaying sensor data to a GEO satellite hub/gateway on the other side of the world (considering that a complete orbit of the LEO satellite occurs in approximately 90 minutes). Accordingly, the various GEO gateways forward the received sensor data via secure networks 121 to a central processing location, such as the secure cloud 123. Further, such routing via the secure networks 121, in some cases, may occur over additional GEO communications satellites.

According to example embodiments, therefore, a novel approach is provided for reducing sensor data latency by equipping LEO sensor satellites (and other airborne, fixed terrestrial and mobile terrestrial sensor vehicles) with a relay terminal. The relay terminal, for example, would be based on current very small picture terminals (VSATs) facilitating communications by such sensor vehicles with standard broadband GEO communications satellites. The system according to such example embodiments thereby provides for transmission of monitored sensor data (virtually in real-time) via numerous GEO communications satellites as relays to respective ground-based earth stations (hubs/gateways) deployed all around the earth, and thereby minimizes latency in the provision of monitored sensor data. Hence, sensor data transmission from a sensor vehicle (e.g., a LEO sensor satellite) would only be interrupted when the satellite transitions between access to communications channels of one GEO communications satellite to another (e.g., over the Earth's poles and areas served by multiple GEO satellites). While over the Earth's poles, for example, there would likely not be access to any GEO communications satellites, as most current GEO satellites travel in an orbit around the equator and thus have footprints covering only out to roughly 70° north and south latitudes (and even at those latitudes the angle of elevation may be too steep for reliable communications). While over the poles of the earth, however, a LEO sensor satellite may still be able to transmit sensor data directly to dedicated LEO sensor system gateways. Alternatively, when transitioning between one GEO can medication satellite and another, monitored sensor data can be stored via a buffering mechanism, whereby, upon reaching the range of the next GEO communications satellite, the buffered data would then be relayed down to the respective GEO hub/gateway associated with that satellite. In that regard, according to one embodiment, the buffered data would be transmitted via a different inroute channel to the hub/gateway so as not to interrupt or delay transmission of the real-time monitored sensor data.

According to a further example embodiment, the system 100 comprises a ground-based network for the aggregation, processing and distribution of the monitored sensor data relayed down to the GEO hub/gateway 120. By way of example, the ground-based network may include a secure network 121 and a secure cloud 123. By way of further example, the ground-based network may also include various processing facilities, such as secure network-based processing facilities 127, secure cloud-based processing facilities 128, and Internet-based processing facilities 129, which may include government operated or controlled processing facilities (e.g., National Oceanic and Atmospheric Administration (NOAA) facilities, Defense Department facilities, and commercial facilities under contract with the government), and private commercial processing facilities. The configuration as to whether the processing facilities are configured to access the sensor data via a secured network means (e.g., via the secure network 121 or the secure cloud 123) or an unsecured network means (e.g., the Internet 125) would depend on the sensitivity of the data being accessed, processed and analyzed. Further, the system 100 may also comprise or utilize one or more additional satellites (e.g., GEO satellite 131). Via such additional satellites, the monitored sensor data may be further disseminated to additional processing facilities. By way of example, certain gathered sensor data may be further disseminated via the satellite 131 to the processing facility 133 for initial or further processing and/or analysis.

According to further example embodiments, once processed and/or analyzed, resulting data and/or analysis information may be passed on to various end-users. By way of example, resulting data and/or analysis information may be passed on to Internet-based end-users (e.g., via terminal 141 and mobile terminal 143) and secure cloud-based end-users (e.g., via terminal 145 and mobile terminal 147). By way of further example, resulting data and/or analysis information may also be passed on via the satellite 131 to end-users at the facility 133 and/or to mobile end-users (e.g., via handheld terminal 135, vehicle-based terminal on vehicle 136 and ship-based terminal on ship 137). As with the processing facilities 128 and 129, the configuration as to whether the end-users are configured to access the sensor data via a secured network means (e.g., end-users 145 and 147 via the secure cloud 123) or an unsecured network means (e.g., end-users 141 and 143 via the Internet 125) would depend on the sensitivity of the data and information. Moreover, the use of modern computing architectures with web servers and application servers facilitates the use by end-users of general purpose desktops, smart phones, and other mobile devices to receive media rich sensor information in near real-time.

Figure 1C:
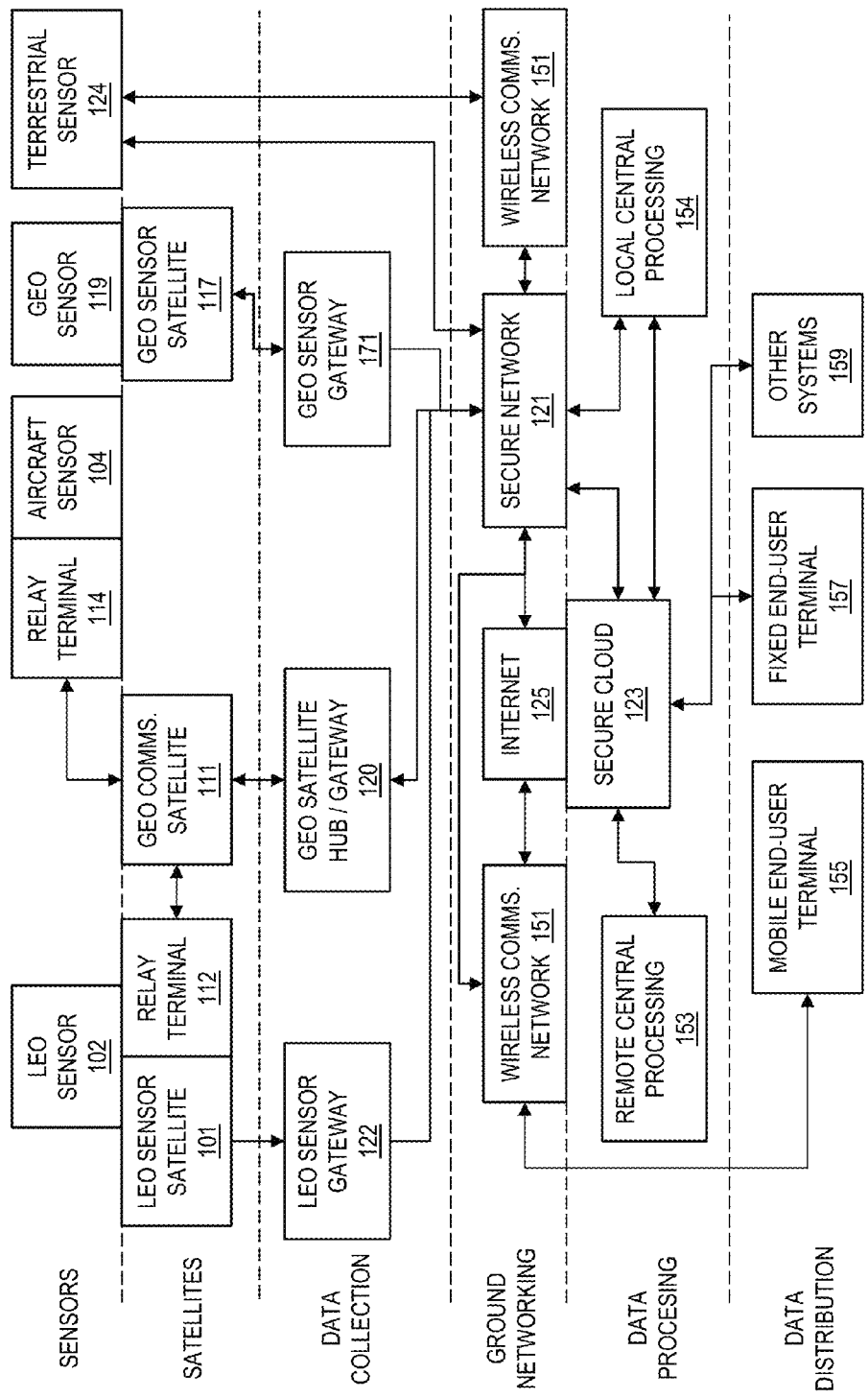
FIG. 1C illustrates a block diagram of the end-to-end (E2E) space-based sensor network system of FIG. 1A, depicting the architecture in a layered format, with various example data/communications flows amongst the components of the different layers, in accordance with example embodiments of the present invention.

FIG. 1C illustrates a block diagram of the end-to-end (E2E) space-based sensor network system of FIG. 1A, depicting the architecture in a layered format and various example data/communications flows amongst the components of the different layers, in accordance with example embodiments of the present invention. With reference to FIG. 1B, according to an example embodiment, the system 100 may be considered as a configuration of various layers, including a sensors layer, a satellites layer, a data collection layer, a ground networking layer, a data processing layer, and a data distribution layer. The sensors layer may include one or more LEO sensors 102, one or more GEO sensors 119, one or more aircraft sensors 104, and one or more terrestrial sensors 124. The satellites layer may include one or more LEO sensor satellites 101, one or more GEO communications satellites 111, and one or more GEO sensor satellites 117. The data collection layer may include one or more LEO sensor gateways 122, one or more GEO communications satellite hubs/gateways 120, and one or more GEO sensor gateways 171. The ground networking layer may include one or more wireless communications networks 151 (for interfacing with wireless terminals), the Internet 125, and one or more secure networks 121. The data processing layer may include one or more remote processing facilities 153, one or more central processing facilities 154, and one or more secure clouds 123. The secure cloud 123 is depicted as being part of the data processing layer, however, as would be recognized, part of the networking function of the secure cloud 123 may be implemented over the Internet 125 and hence may be considered as overlapping between the ground networking layer and the data processing layer. Further, the secure cloud 123 may also be configured with one or more processing facilities being a part thereof. The data distribution layer may include one or more mobile end-user terminals 185, one or more fixed end-user terminals 187, and one or more other data distribution systems 189.

As further depicted by FIG. 1C, according to an example embodiment, each LEO sensor satellite 101 would be equipped with one or more of the LEO sensors 102 and a LEO relay terminal 112, and each GEO sensor satellite 117 would be equipped with one or more of the GEO sensors 119. When the LEO relay terminal 112 is within communications range with a one of the GEO communications satellites 111, the relay terminal is configured to relay or transmit sensor data to the ground-based network via the GEO communications satellite and an associated GEO communications hub/gateway 120. Alternatively, when LEO sensor satellite 101 is within communications range with a dedicated LEO sensor gateway 122, the LEO sensor satellite may relay or transmit the sensor data to the ground-based network via the LEO sensor gateway. As with the LEO sensor satellite 101, the aircraft sensor 104, when within communications range with a one of the GEO communications satellites 111, the aircraft sensor is configured to relay or transmit sensor data to the ground-based network via the GEO communications satellite and associated GEO communications gateway. The terrestrial sensors 124 are configured to transmit sensor data, for example to a secure network 121 either via a direct link or a wireless link through a wireless communications network 151 (e.g., the choice between a direct versus a wireless link from the terrestrial sensor may depend on the location of the sensor and access to terrestrial or wireless communications services). Further, as depicted, the data flows associated with the various sensors in the sensor layer comprise bidirectional data flows. As described above, the data flows from each of the sensors to the ground-based network (via the respective communication means) facilitate the transmission of sensor data to the ground-based network. In the opposite direction, with regard to the data flows from the ground-based network up to the sensors, such flows facilitate command, control and configuration functions with respect to the operations of the respective sensors.

Turning to the ground networking layer, the data flow to and from the respective sensors typically occurs through a one of the secure networks 121. This facilitates a desired level of security with respect to the data collected by the respective sensors and the command, control and configuration of the sensors. From a secure network 121 the data can be provided to one or more of the central processing facilities 154 and/or one or more of the remote processing facilities 153 (e.g., processing facilities 127, 128, 129 of FIG. 1A) via a direct connection or via a network connection through the secure cloud 123. Once the data is processed and/or analyzed, resulting data and information may be distributed to one or more mobile end-user terminals 155 (e.g., terminals 143 and 147 of FIG. 1A), one or more fixed end-user terminals 157 (e.g., terminals 141 and 145 of FIG. 1A) or one or more other systems 159. Again, depending on the sensitivity of the resulting data and information, the distribution may be via the Internet 125 or via the secure cloud 123. Further, according to one embodiment, communications between network nodes is configured using Multiprotocol Label Switching (MPLS). MPLS is a protocol architecture for high-performance communications networks, whereby data is directed from one network node to the next based on short path labels rather than long network addresses (which avoids complex route table lookups). The labels identify virtual links between nodes rather than endpoints, and MPLS can be configured to encapsulate packets of various network protocols. Moreover, as is evident, the data processing and networking provided according to example embodiments is not intended to be limited to only those flows described in depicted herein, but rather is extremely flexible, and envisions other potential network data flows within the scope of such end-to-end (E2E) networking systems for consolidating the aggregation and processing of data from multiple systems in a general-purpose architecture.

According to certain example embodiments, the data processing layer may be designed to center around secure cloud processing via the secure cloud 123. According to one such embodiment, the sensor data may be transmitted via a secure link to the secure cloud. For example, the secure ground network 121 provides virtual private network (VPN) links and provides access to the secure cloud facility comprising scalable computing, software, and storage facility for sensor data processing. The secure cloud 123 may comprise a number of computers or processors linked through a secure real-time communication network (e.g., distributed computing over a secure network). The data processing thereby leverages scalable computing environments, for example, comprising: (1) infrastructure computers, including disk drives, LAN devices, monitoring equipment, security equipment, and WAN connections; (2) platforms including operating systems, database management systems, business intelligence, web servers, application servers, management software; and (3) applications comprising mission specific sensor algorithms and historical data, processes and rules. The cloud processing relies on a secured network of shared resources, focusing on maximizing the effectiveness of the resources, dynamic allocation of the resources based on demand, and thereby achieving coherence across the cloud and taking advantage of economies of scale.

By way of example, employing cloud processing via the secure cloud 123 across multiple sensor systems provides a means for increasing processing capacity and adding capabilities, in real time, without requiring investment in new infrastructure. Secure cloud processing thereby provides the ubiquitous secure processing platform across multiple systems. In that regard, the remote central processing facility 153 may be viewed as a processing component within the secure cloud 123. Alternatively, the remote central processing 153 may provide additional remote processing outside of the secure cloud 123. For example, the secure cloud 123 may be configured to be accessible by the secure network 121 via direct secure links or via virtual private network (VPN) links through the Internet 125. Further, for a fully secure solution, all communications to and from the secure cloud 123 may be via fully secured links, and all communications between the components within the secure cloud 123 would similarly be via fully secured links. For example, the mobile-sensors depicted in FIG. 1B may all be sensing data for a common mission. Accordingly, in view of the multiple paths for relaying the monitored data (from different locations at potentially common times), and in view of the centralized secure cloud data processing, potentially interrelated occurrences or circumstances (from different parts of the earth or earth's atmosphere) may be analyzed together in real-time. In an alternative scenario, where the mobile-sensors depicted in FIG. 1B are sensing data for different missions (e.g., the LEO and vehicle sensors are deployed for a defense mission, and the aircraft and ship sensors for a weather mission), for each mission, the system still provides real-time centralized data processing for potentially interrelated mission data from different locations around the world. Additionally, across both missions, secure, efficient and cost-effective centralized processing is provided, where the infrastructure is leveraged across both systems, and processing capabilities may be dynamically scaled in real-time based on mission requirements.

Moreover, providing such cloud processing in this novel manner for space-based, airborne, mobile terrestrial and fixed terrestrial sensor systems achieves numerous additional advantages, including redundancy, self-healing, software adaptation, secure multi-tenancy, dynamic scalability, and virtualization. Redundancy: all network, computing, storage, power, air conditioning components, etc. are configured and provisioned to provide redundancy and high availability to for the respective systems; and redundancy may be extended to all network circuits, for example, whereby all Internet and MPLS circuits would have redundant carriers and at least two different paths for each bandwidth solution. Self-healing: in case of failure of an application, the processing environment could be configured to provide a hot backup without disruption—in such a configuration there would be multiple copies of the same application, whereby each copy is updated regularly to ensure at least one backup is available to take over without any change in running state. Software Adaptation (Migration Solutions): Services and tools are provided to evaluate, consolidate and migrate existing sensor data processing applications with application prioritization and physical-to-virtual and virtual-to-virtual assessments for scalability, SLA compliance, and provisioning. Secure Multi-Tenancy: Dedicated computing and/or storage resources can be allocated to a particular network/system, ensuring secure storage and processing of sensor data from each system—which is provided through virtualized and segregated environments, with provisioning of servers into allotted machine pools and allocating processing resources to that virtual container. Dynamic Scalability: Ensures maintenance of service level agreements (SLAB)—for example, when system resources experience peak of loads, the virtual environment can be dynamically re-configured to automatically adjust resource allocation. Virtualization: Sensor processing applications can be configured as decoupled from the underlying hardware—for example, the data center environment is configured as a fully virtualized environment for maximum security and scalability, which enables the secure processing of a large variety of workload types (e.g., varying from small loads of small consumer-specific applications to large loads of commercial or government applications).

According to a further example embodiment, local central processing 154 may be provided via direct link with the secure network 121. Additionally, secure links may be provided between the secure cloud 123 in the local central processing 154 to provide coordinated processing by the local central processes facility and the secure cloud. Such links may further be employed for the dissemination of the processed data resulting from the processing by a local central processing facility 154 and/or the secure cloud 123. With regard to data distribution, the resulting data and information generated by the data processing layer would then be disseminated or distributed to end-users via various means. For example, the post-processing data and information may be provided to fixed end-user terminals 157 and other systems 159 via terrestrial links from the Internet 125 and/or the secure cloud 123. Further, the post-processing data and information may be provided to mobile end-user terminals 155 via wireless communications network 151. Such data distribution, is also depicted in FIG. 1A as terrestrial wired and wireless communications between the Internet 125 and the end-user terminals 141 and 143, and between the secure cloud 123 and the end-user terminals 145 and 147. As further depicted in FIG. 1A, additional post-processing data distribution can be performed via a GEO satellite 1312 remote fixed and mobile end-user terminals 133, 135, vehicle terminal 136, and ship terminal 137.

Figure 2A:
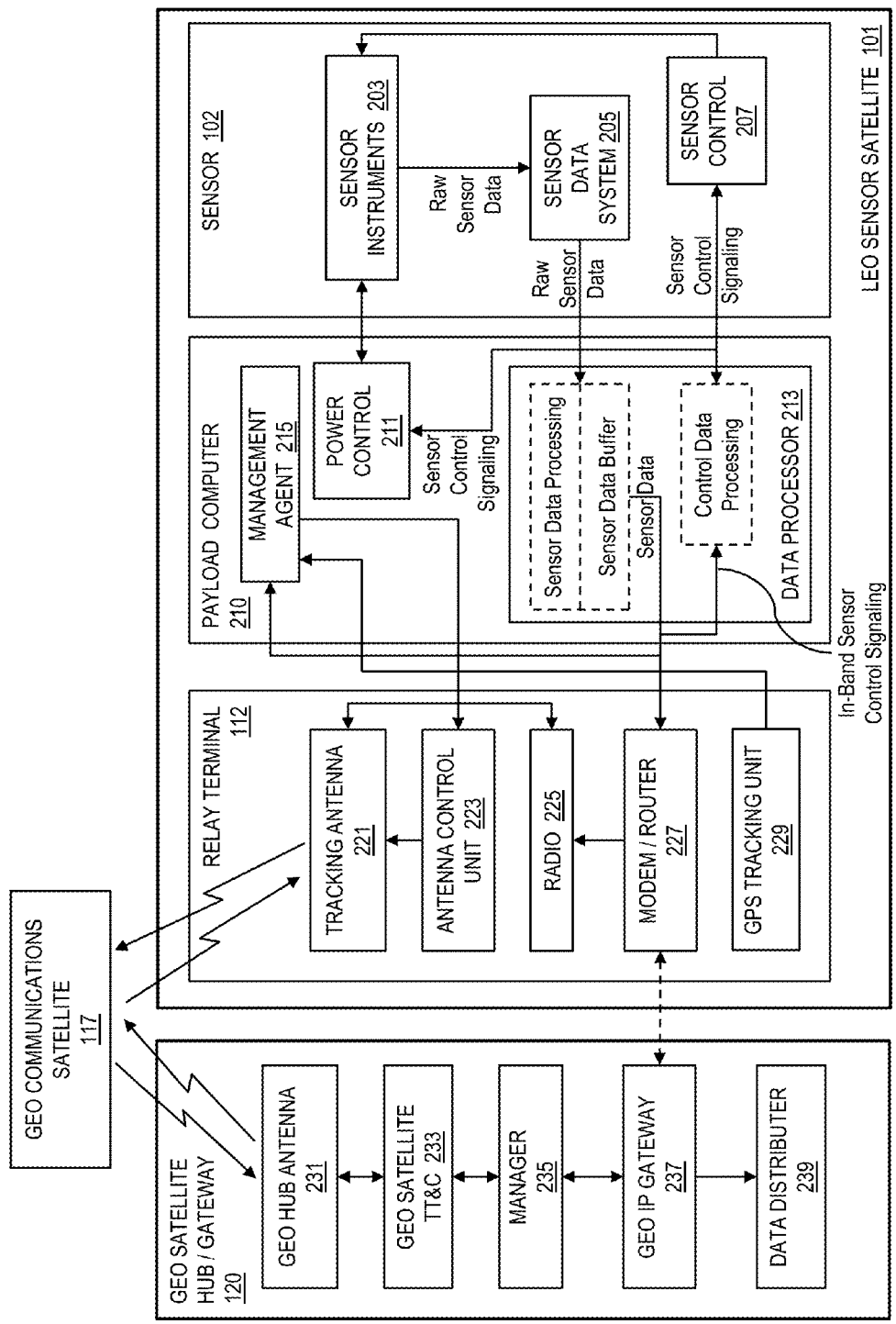
FIG. 2A illustrates a block diagram depicting an example of the data collection subsystem of FIG. 1B, depicting a low earth orbit (LEO) sensor satellite as an example for the data collection operation of a space-based sensor, in accordance with example embodiments of the present invention.

FIG. 2A illustrates a block diagram depicting an example of the data collection subsystem 130 of FIG. 1B, depicting a low earth orbit (LEO) sensor satellite as an example for the data collection operation of a space-based sensor, in accordance with example embodiments of the present invention. According to example embodiments, the LEO sensor satellite 101 comprises a sensor 102, a payload computer 210 and a relay terminal 112. The sensor 102 includes the sensor instruments 203, which perform the physical monitoring functions and relay resulting raw sensor data to the sensor data system 205. The sensor data system 205 passes the raw sensor data to a data processor 213 within the payload computer 210. The sensor 102 further includes a sensor control unit 207 which receives sensor control signaling from the data processor 213 and manages the control of the sensor instruments 203, accordingly. The payload computer 210 includes a management agent 215, which is configured to control various functions of the LEO satellite, such as the data buffering functions and transmission of sensor data via the relay terminal 112, and the transition between states of sensor data buffering and sensor data transmission. The payload computer 210 further includes a power control unit 211, which is configured to control power related functions associated with the sensor 102 (e.g., powering the sensor instruments 203 on and off for power management and conservation).

The relay terminal 112 includes a tracking antenna 221, which (according to one embodiment) is gimbal-mounted for tracking GEO satellites and ground-based LEO gateways as the orbital plane of the LEO satellite brings different GEO communications satellites and LEO gateways in and out of communications range. In that regard, based on the table of available GEO communications satellites, the management agent 215 would be configured to provide control signals to the antenna control unit 223, for controlling the tracking antenna 221 based on the a priori knowledge of the locations of GEO communications satellites 117 and compatible ground-based LEO gateways 122. The relay terminal 112 also includes an antenna control unit 223, which is configured to control the tracking antenna 221, and a GPS tracking unit 229, which is configured to track the location of the LEO satellite 101. The relay terminal 112 further includes a satellite radio 225 and a modem/router 227, which are configured to perform the requisite data and signal processing (e.g., encoding and modulation, signal filtering and amplification, etc.) for data transmissions via the tracking antenna 221. With regard to data transmissions, according to example embodiments, the data processor 213 of the payload computer 210 perform such functions as sensor data processing and sensor data buffering and system management and control data processing. By way of example, the sensor data processing function of the data processor 213 receives the raw sensor data from the sensor data system 205 and translates or adapts the data as may be necessary for the ground-based processing. During the sensor data buffering mode, the sensor data buffer function of the data processor 213 buffers the processed sensor data, and, during the sensor data transmission mode, the sensor data processing function forwards the processed sensor data on to the modem/router 227 for transmission by the relay terminal 112. Further, the sensor data processing function of the data processor 213 may perform encryption of the sensor data, depending on the sensitivity of the data and the mission requirements.

By way of further example, the control data processing function of the data processor 213 receives in-band sensor control signaling from the modem/router 227. Such in-band control signaling may be transmitted from the GEO satellite hub/gateway 120 for the purpose of controlling various functions of the LEO satellite 101. The control data processing function processes the received in-band control signaling, and relays control commands to the power control unit 211 and/or the sensor control unit 207, accordingly. Further, such in-band control signaling may be leveraged to provide other general satellite command and control signals to the payload computer 210. The in-band control signaling is provided using extra data bits of other signals already being transmitted by the GEO satellite hub/gateway (via the GEO communications satellite 117) to the LEO satellite relay terminal 112. In this manner, the system takes advantage of the communication path from the GEO satellite hub/gateway 120 and the LEO satellite 101 to provide command and control signaling that would otherwise require a separate satellite tracking, telemetry and control (TT&C) link for communication of such command and control signaling to the LEO satellite.

According to a further example embodiment, when it sensor data transfer to a new GEO communications satellite is desired—e.g., based on the location of the LEO sensor satellite, a preferred GEO communications satellite is chosen by the management agent, the management agent 215 commands the modem/router 227 to tune to the respective GEO satellite. In that regard, the management agent provides the modem with the requisite parameters (e.g., the outroute frequency, symbol rate and polarization at which the modem needs to receive the outroute transmitted by the ground-based GEO gateway, via the respective GEO satellite). Based on that out route frequency, symbol rate and polarization, the modem will tune to the outroute transmission to obtain reference timing signals. Once timings acquired, the modem decodes the outroute transmission to determine the inroutes available for transmissions to the GEO gateway via the respective GEO satellite. The GEO gateway outroute transmission provides the requisite information for in route transmissions from all terminals within the inroute coverage beam of the respective GEO satellite. The modem thereby obtains the requisite parameters (e.g., the transmission frequency) for transmissions to the GEO gateway (e.g., transmissions including requests for bandwidth allocation for the sensor data transmission).

Figure 2B:
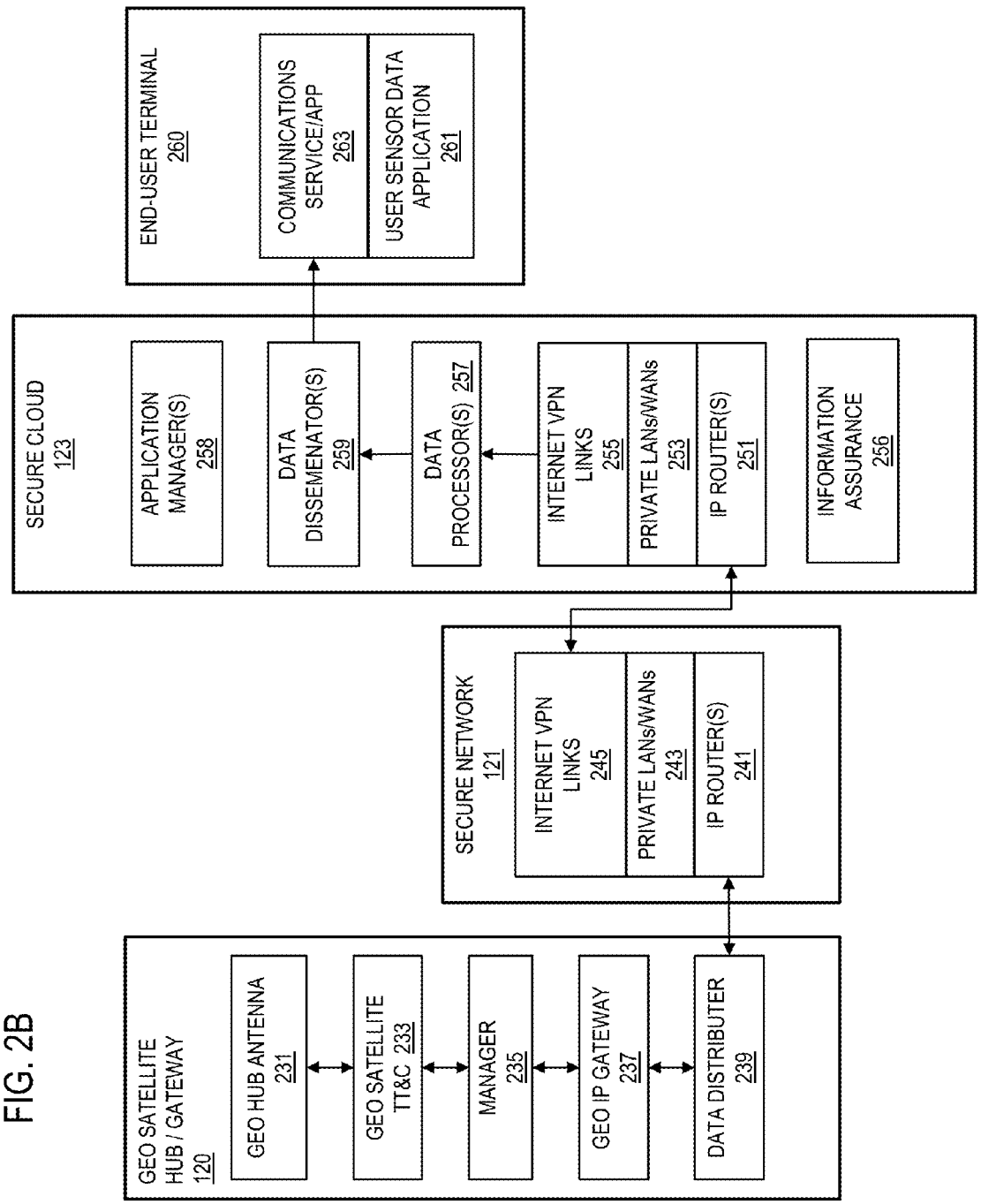
FIG. 2B illustrates a block diagram depicting an example of the ground networking, data processing and data distribution subsystems of the system of FIG. 1A, in accordance with example embodiments of the present invention.

FIG. 2B illustrates a block diagram depicting an example of the ground networking, data processing and data distribution subsystems of the system of FIG. 1A, in accordance with example embodiments of the present invention. With reference to FIG. 2B, the GEO satellite hub/gateway 120 further includes a data distributer 239, which routes the received sensor data via a secure link to the secure network 121. The secure network 121 may be made up of various secure networking links including IP routers 241, private local area networks (LANs) and/or wide area networks (WANs) 243 and/or virtual private network (VPN) links 245 through a public network (e.g., the Internet). From the secure network 121, the data is then distributed to the secure cloud 123 for data processing and analysis. As described above, the secure cloud 123 may comprise a network of distributed secure processing resources linked through a secure real-time communication network (e.g., distributed computing over a secure network). In that regard, the secure cloud 123 may comprise a number of data processor 257, where the processors are linked via a secure network. Accordingly the secure cloud 123 may also comprise IP routers 251, private LANs/WANs 253 and Internet VPN links 255. Further the secure cloud includes one or more data disseminators 259, configured to forward the post-processed sensor data and associated information on to end-user terminals for consumption by respective end-users. An end user terminal 260 may comprise a communications service/ application 263, which provides the necessary communications processing for receipt of the post-processing data and information from the data disseminators 259 of the secure cloud 123, and one or more user sensor data applications 261, which provide for presentation of the received post-processing sensor data and information to the end-user. Further, the user sensor data applications 261 may also provide for data security while sensor data is being utilized on the user terminal 260.

According to further example embodiments, at various points within the ground networking, data processing and data dissemination portions of the system, information assurance may be employed, as required. For example, when required, all data will be stored in an encrypted form, only processed on secure platforms, and only transmitted over secure links and/or in encrypted form. Also, within the secure cloud 123, information assurance 256 is provided to ensure that all data processing is performed on secure platforms and all transmission of data within the cloud is performed in the secure manner (e.g., on secure links and/or encrypted). Additionally, the secure cloud 123, may further comprise one or more application managers 258, which provides for adaptation of data processing to meet potentially updated processing requirements of the different sensor systems being serviced. The application manager they further perform application monitoring functions, data processing prioritization, user access control (e.g., restriction of cloud user and operator access, for example, in accordance with role-based access restrictions). Information assurance may further be provided through application subscription and user registration functions to restrict access to certain data to only end-users entitled to access such data. The data processors 257 may also perform such functions as residual calibration, data aggregation, data filtering, modeling and inferencing, forecasting, and data archival and archive retrieval.

Figure 3A:
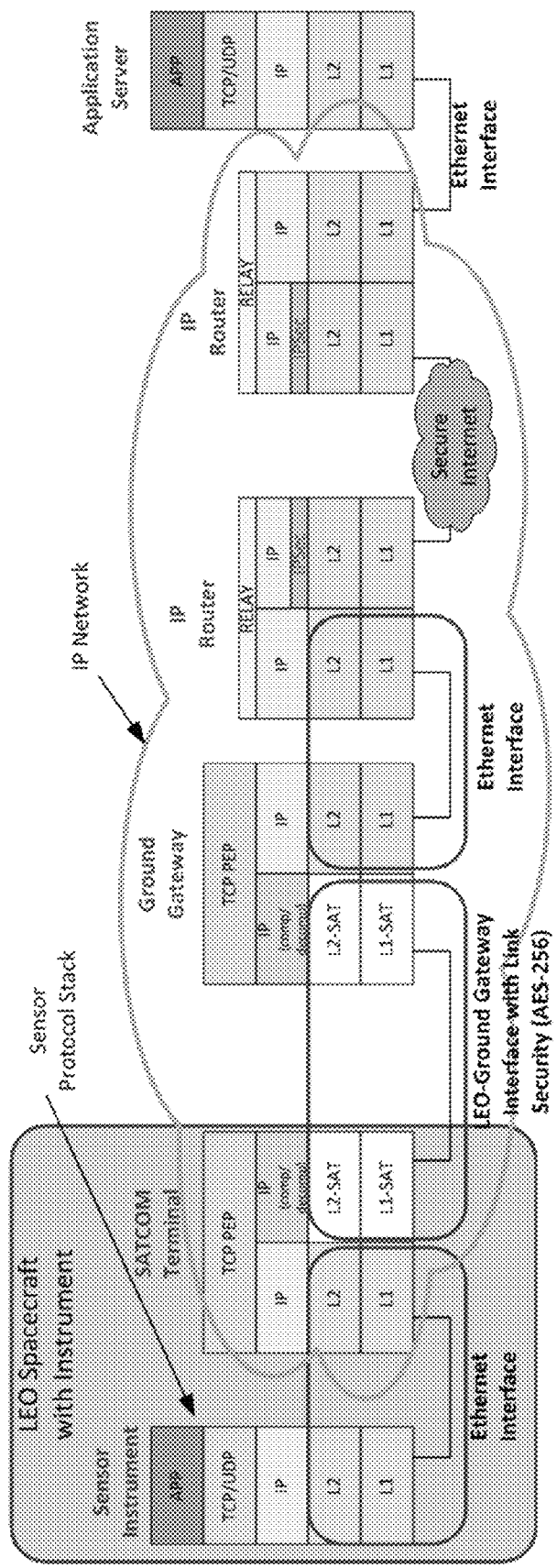
FIG. 3A illustrates a block diagram depicting an example of the stack configurations of an IP-based sensor on-board a LEO satellite, in the context of the interaction between the sensor user-plane and the ground-based networking, in accordance with example embodiments of the present invention.
Figure 3B:
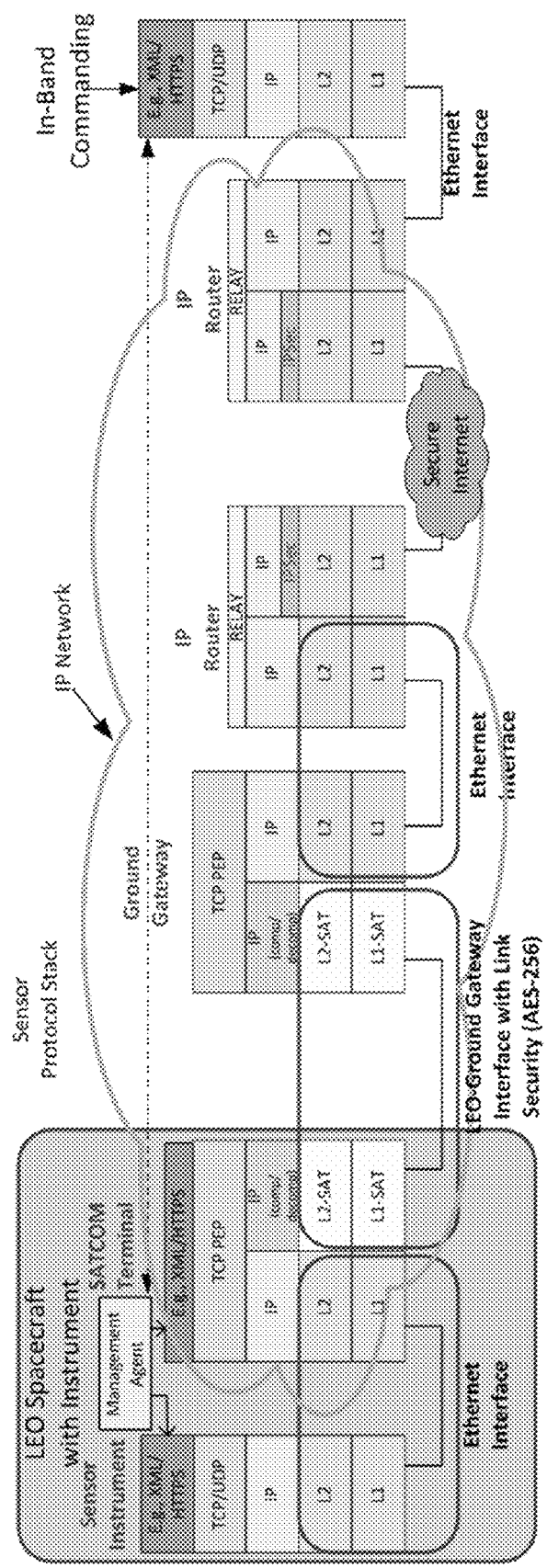
FIG. 3B illustrates a block diagram depicting an example of the stack configurations of an IP-based sensor on-board a LEO satellite, in the context of the interaction between the sensor management-plane and the ground-based networking, in accordance with example embodiments of the present invention.

FIG. 3A illustrates a block diagram depicting an example of the stack configurations of an IP-based sensor on-board a LEO satellite, in the context of the interaction between the sensor user-plane and the ground-based networking (e.g., the secure network), and FIG. 3B illustrates a block diagram depicting an example of the stack configurations of an IP-based sensor on-board a LEO satellite, in the context of the interaction between the sensor management-plane and the ground-based networking (e.g., the secure network), in accordance with example embodiments of the present invention. According to example embodiments, the specific sensor instrumentation may employ any of a number of sensor and communications protocols, whereby data adaptation and translation may be employed on-board the sensor host vehicle and/or within certain of the ground infrastructure to format the data for processing by the respective central processing systems. By way of example, the sensor on-board the LEO spacecraft implements IP based protocols for user plane as well as management/control plane operation. For example, the user plane may employ a transmission control protocol/Internet protocol (TCP/IP) or user datagram protocol/Internet protocol (UDP/IP), and the management/control plane may employ a simple network management protocol (SNMP), hypertext transfer protocol (HTTP) or hypertext transfer protocol secure (HTTPS) over TCP/IP protocols. The management/control plane comprises a management agent 215 that controls the various management/control components and functions. Utilizing sensors that employ IP based protocols permits ubiquitous interoperability with existing IP networks and allows management and control of sensor instruments directly and securely from existing ground based management systems.

Figure 3C:
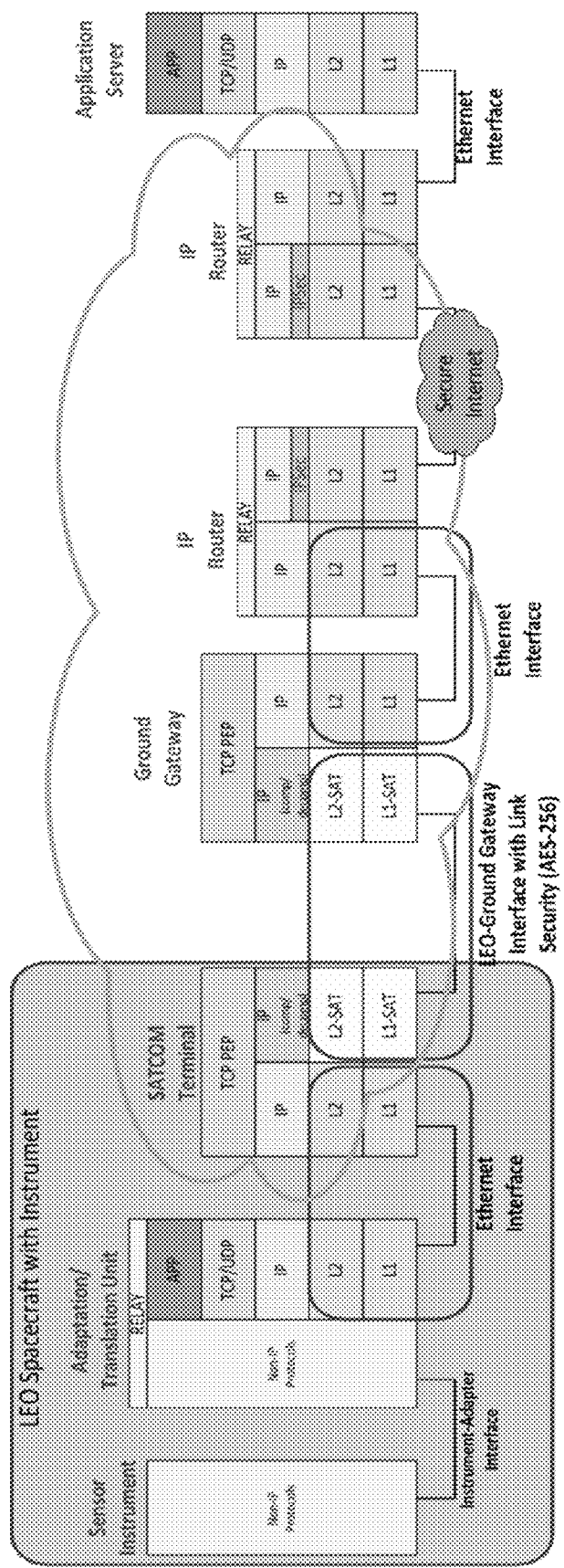
FIG. 3C illustrates a block diagram depicting an example of the stack configurations of an non-IP-based sensor on-board a LEO satellite, employing an adaptation/translation unit in the context of the interaction between the sensor user-plane and the ground-based networking, in accordance with example embodiments of the present invention.

FIG. 3C illustrates a block diagram depicting an example of the stack configurations of an non-IP-based sensor on-board a LEO satellite, employing an adaptation/translation unit in the context of the interaction between the sensor user-plane and the ground-based networking (e.g., the secure network), in accordance with example embodiments of the present invention. According to an alternative example embodiment, sensor instruments may employ protocols other than IP-based protocols (which do not employ an IP stack). In such cases, an adaptation/translation function would be required to convert the non-IP protocol data and signaling to an IP-based protocol in order to maintain interoperability with external IP networks. The Adaptation/Translation unit is a protocol conversion unit that converts non-IP protocols to IP based protocols. Non-IP protocols are terminated at the Translation/Adaptation unit and TCP/IP or UDP/IP based protocols are initiated towards external IP network. In one embodiment, the Adaptation/Translation Unit may be implemented outside the SATCOM terminal on the LEO spacecraft. In an alternative embodiment, it may be implemented in the SATCOM terminal itself.

More specifically, with regard to data collection, according to example embodiments, the sensor instrument collects raw data and provides that data, via the sensor data system 205, to the data processor 213 of the payload computer 210. Within the data processor 213, the sensor data processing function translates or formats the raw data based on a desired protocol. By way of example, the LEO satellite is configured for performing a number of data processing functions for efficient data handling and processing within the ground-based infrastructure (e.g., the GEO satellite hub/gateway 120 and the ground-based network and processing facilities—the secure network 121, the Internet 125, the secure cloud 123 and other processing facilities). For example, in the case of IP protocol, the sensor data processing function of the data processor will translator format the raw data into IP packets (and, as necessary, further encapsulate those IP packets for processing by the modem router 227) for transmission by the relay terminal 112, down to the GEO satellite hub/gateway 120. Further, the desired protocol may be driven by compatibility requirements for routing and processing of the ground networking and ground-based data processing. Further, such data processing functions may also include data buffering, data pruning, data compression, and data tagging for priority, time, location and mission identification.

With regard to data buffering, according to an example embodiment, the raw data collected by the sensor instrument may need to be buffered by the LEO satellite under certain scenarios, such as: (i) when the LEO satellite is relaying the sensor data via GEO communications satellites to ground-based GEO gateways, and travels outside of the communications range of any GEO communications satellites (e.g., when the LEO satellite is over either the North or South Pole, or during a brief communications handover transition period from one GEO satellite to another); or (ii) when the LEO satellite is transmitting the sensor data directly to a ground-based LEO gateway, and the LEO satellite becomes unable to communicate the LEO gateway (e.g., due to the LEO gateway antenna being unable to track the LEO satellite below a certain elevation angle; or (iii) when the LEO satellite is transmitting the sensor data directly to a ground-based LEO gateway, and the LEO satellite is located over a region of the earth where there are no available LEO ground-based gateways (and the LEO satellite is not within communications range of any GEO communications satellites to which you can switch its sensor data transmission for relay to the respective ground-based GEO gateway).

According to a further example embodiment, the buffering of sensor data and the transmission of sensor data by the relay terminal 112 would be controlled by the management agent 215 of the LEO satellite payload computer 210. By way of example, the buffering of sensor data may be triggered based on knowledge of the current instantaneous location of LEO spacecraft, with respect to locations of any available GEO communications satellites and/or locations of any LEO ground-based gateways (LEO gateways with which the LEO satellite may be configured to communicate). In that regard, the management agent 215 performs its control of the sensor data buffering function based on the pre-programmed table identifying the available GEO communications satellite coverage and/or compatible ground-based LEO gateway locations around the Earth. According to one embodiment, the management agent 215 would be configured to also provide control signals to the antenna control unit 223, for controlling the tracking antenna 221 based on the a priori knowledge of the locations of GEO communications satellites 117 and compatible ground-based LEO gateways 122 within the constellation of the LEO satellite 101.

Additionally, to conserve or minimize power usage, and to minimize adverse impact of adjacent satellite interference and also minimize usage of LEO power, during periods when the buffering process is being performed, the management agent 215 would be configured to command modem/router 227 to shut down transmissions of the LEO satellite relay terminal 112. Then, when the LEO satellite moves within the communications coverage range of a GEO communications satellite and/or a compatible ground-based LEO gateway, the management agent 215 would be configured to command the modem/router 227 to turn back on to resume sensor data transmissions to the respective GEO satellite or compatible LEO gateway. Further, the management commands that control the power up of the modem can also include communication details identifying such parameters as the channel frequency to which the modem should tune and the symbol rate at which the modem is expected to receive signals from the GEO satellite or LEO ground gateway. Moreover, to minimize any downtime during the period of modem boot-up (between the point when the modem is instructed to power up and the time the modem is ready for transmission/reception), the power up command can be provided to the modem a period of time before the actual transmission is to begin (such period of time being calculated so that the modem is ready for transmission/reception at the time when the LEO satellite enters the communications range of the GEO satellite or LEO gateway).

According to a further example embodiment, the modem/router 227 would be configured to provide feedback to the management agent 215. For example, the modem/router 227 would monitor the signal quality of forward link signals from the LEO ground gateway or GEO satellite, and the feedback provided to the management agent can indicate when the modem is not receiving signals of sufficient quality for reliable communications. In response to such feedback indicating insufficient signal quality, the management agent can determine the availability of an alternate GEO satellite or compatible LEO ground gateway. Upon locating an alternate GEO satellite or compatible LEO gateway, the management agent would command the modem to tune to the alternate satellite or gateway, and signal the antenna control unit 223 to steer tracking antenna to the alternate satellite or gateway same document go to sleep. If no such GEO satellite or LEO ground gateway is available, then the management agent can switch the data processor to the sensor data buffering mode until the LEO satellite 101 enters the communication range of another GEO communications satellite 117 and/or ground-based LEO gateway 122.

The data buffering described above pertains to periods when there is no LEO-GEO link availability or LEO-ground link availability, and the buffering function can be implemented within the modem or outside the modem (e.g., within a data processor of the payload computer, as depicted in FIG. 2A). When LEO-GEO link(s) or LEO-ground link(s) are available, however, according to an example embodiment, data buffering may still be provided within the modem/router 227 to address situations where instantaneous variations in link conditions may result in periods of inability to successfully transmit the sensor data or inability to transmit the sensor data at a sufficient rate to keep up with the rate at which the sensor data is being generated. In such circumstances, the modem buffers data in an internal buffer. The situation may arise, however, where the link remains in the degraded condition for such a period of time that the modem buffer fills up. In such a situation, there may be a need for flow control of the sensor data arriving at the modem. According to one embodiment, flow control can be employed via techniques such as the use of an Ethernet Pause Frame, as provided in accordance with the Ethernet standard IEEE 802.3x, whereby the modem sends a PAUSE frame to the entity providing the sensor instrument data (e.g., the sensor data processing function of the data processor 213). Alternatively, flow control may be employed in accordance with techniques described in the Internet Engineering Task Force (IETF) RFC 5578 (PPPoE Extensions for Credit Flow and Link Metrics).

Figure 4A:
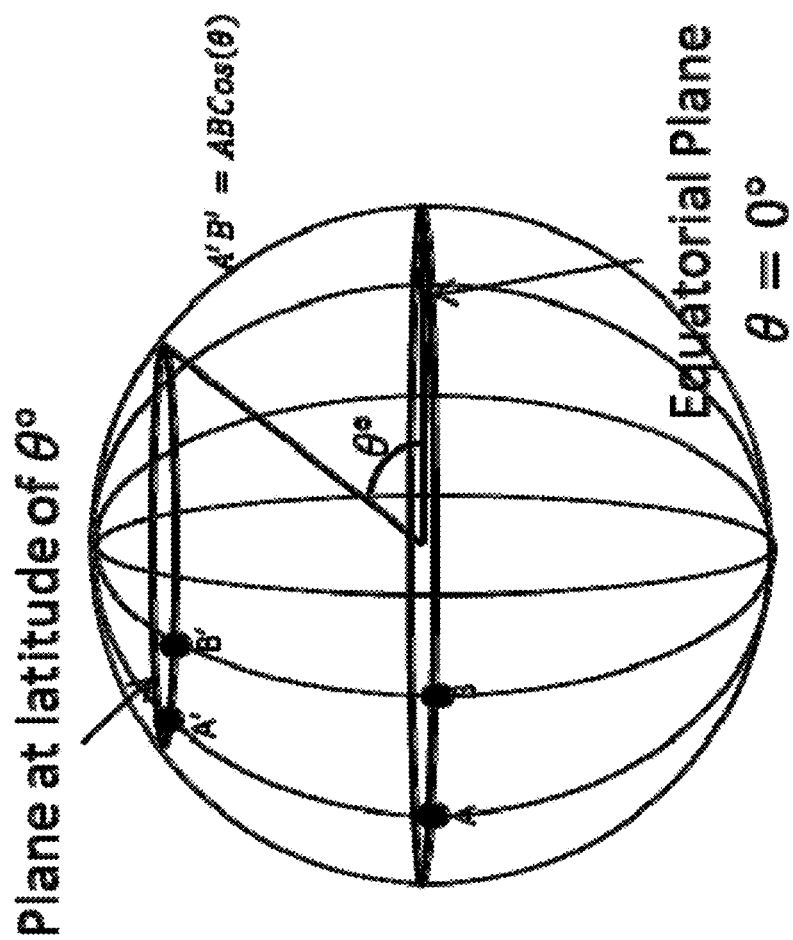
FIGS. 4A and 4B illustrate a diagram and graph, respectively, of distances between instrument scans for different low earth orbit (LEO) satellite orbits relative to distance of the respective orbit to an orbit over the equatorial plane, in accordance with example embodiments of the present invention.
Figure 4B:
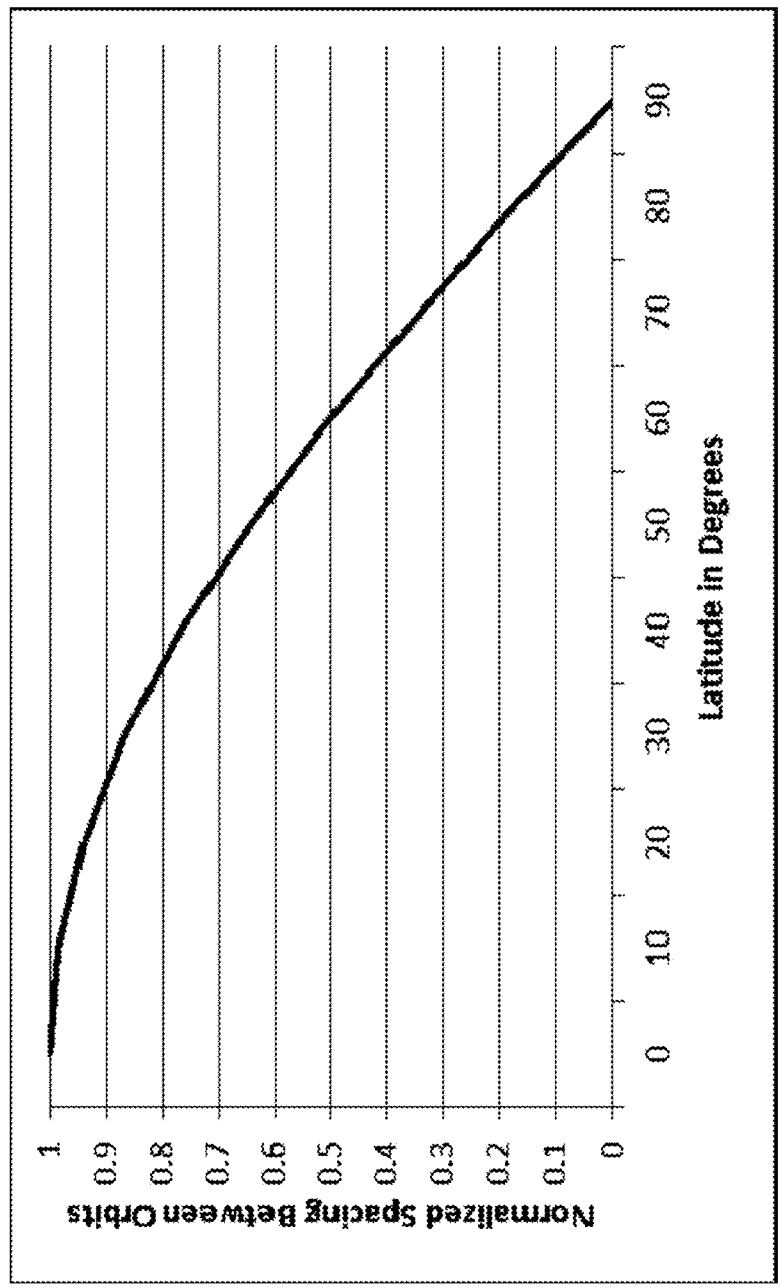

FIGS. 4A and 4B illustrate a diagram and graph, respectively, of distances between instrument scans for different low earth orbit (LEO) satellite orbits relative to distance of the respective orbit to an orbit over the equatorial plane, in accordance with example embodiments of the present invention. In the context of FIGS. 4A and 4B, with regard to data pruning, data buffering may be required when the LEO sensor satellite is relaying sensor data to a ground-based GEO satellite gateway, and the LEO satellite orbit moves within a certain distance of North or South Pole (as provided above, this is because GEO satellites typically provide coverage only up to about +/−70 degrees latitude). Further, whenever the LEO satellite transitions from a location with no GEO satellite or LEO gateway coverage to a location where GEO satellite and/or LEO ground gateway links are available, the LEO satellite would typically be configured to first initiate and complete transmission of all buffered sensor data and then switch to transmission of real-time sensor data. Under such a scenario, not only would there be a delay in transferring the buffered data during the period of unavailability of any GEO satellite or LEO gateway coverage, but there would also be a delay in the transfer of real-time sensor collected after the LEO satellite entered the range of a GEO communications satellite or a ground-based LEO gateway, while the LEO satellite transmits the buffered sensor data.

According to a further embodiment, therefore, in order to minimize such delays in the transmission of the buffered sensor data and the real-time sensor data collected during the transmission of the buffered sensor data, the system takes advantage of the fact that instrument scans in different LEO orbits are much closer to each other near the poles (at higher latitudes) than in orbits closer to the equatorial plane. This phenomenon is evident from the diagram of FIG. 4A and the associated chart of FIG. 4B, which demonstrate that scanning is about two times more dense at a latitude of 60 degrees as compared to a latitude of 0 degrees (at the equator), and scanning is about four times more dense for a latitude of 75 degrees compared to equator. Hence, there would be a significant overlap between scanned data of adjacent orbits at higher latitudes. Accordingly, the monitored sensor data of every other orbit at latitude 60 degrees can be pruned, and the monitored sensor data from three out of every four orbits at 75 degrees latitude can be pruned, which would result in reducing data transmission delays at LEO satellite positions near the North and South Poles.

Figure 4C:
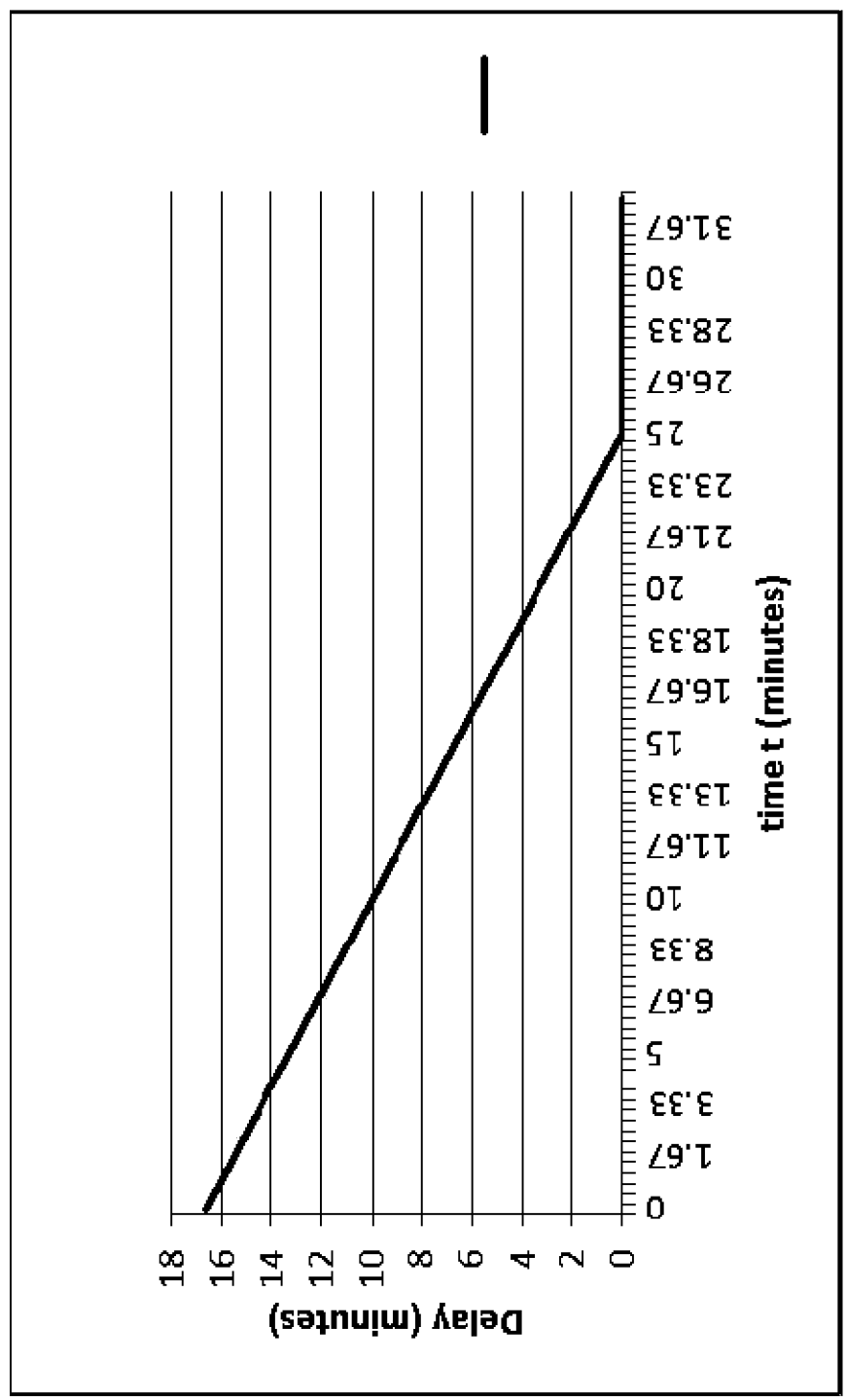
FIG. 4C illustrates a chart depicting the delay profile experienced by IP packets in an example scenario for a LEO sensor satellite outside of the coverage areas of any GEO satellites and/or LEO gateways for latitudes greater than 60 degrees, in accordance with example embodiments of the present invention.

FIG. 4C illustrates a chart depicting the delay profile experienced by IP packets in an example scenario for a LEO sensor satellite outside of the coverage areas of any GEO satellites and/or LEO gateways for latitudes greater than 60 degrees, in accordance with example embodiments of the present invention. By way of example, if the LEO satellite was outside of the coverage areas of any GEO satellites and/or LEO gateways for latitudes greater than 60 degrees, and if the orbital period is nominally 100 minutes, then the LEO satellite would need to buffer for only about 16.67 minutes near North Pole where the latitude is higher than 60 degrees (similarly LEO satellite would need to buffer for only about 16.67 minutes near the South Pole where latitude is lower than −60 degrees) in each orbit. Further, assuming a sensor data rate of 5 Mbps and a relay terminal sensor data transmission rate of 15 Mbps, the delay profile experienced by IP packets in the buffer is shown in FIG. 4C. The average data rate is therefore computed to be $(0.5*16.67*25/50)$ =4.16 minutes per orbit. With a data pruning approach, however, where data corresponding to every other orbit near the poles (above 60 degree latitude) is pruned, the average delay becomes $(0.5*16.67*25/100)$=2.08 minutes. Under the condition that a LEO satellite is within the latitudes of +/−60 degrees, the average queuing delay experienced by packets containing corresponding instrument data is approximately (0.5*5.55*8.33/33.33)=0.694 minutes=41.65 seconds. Accordingly, when data pruning is performed (as described above), the corresponding average delay reduces to 21.3 seconds.

As a further enhancement, the data pruning process may be configured to intelligently determine the orbit in which data pruning occurs, which would prove useful when it is deemed that instrument data corresponding to regions near+/−60 degrees latitude is important to be transmitted with lower latency. In such cases, data pruning is performed to sensor data from orbits where instrument data needs to be transmitted to the ground with reduced latency.

According to an example embodiment, the management agent 215 of the in LEO satellite payload computer 210 would be configured to perform the function of managing data pruning processes and determining at which orbits near the poles data pruning should be employed. Further, the management agent can be configured to communicate with a management server in the ground network, whereby the management server would provide information regarding the relative importance of certain monitored sensor data from one orbit versus other orbits. In accordance with such a framework, whereby a management server of the ground network provides such information, the information can be provided in a dynamic manner facilitating flexibility in the application of data pruning throughout the orbits of the mission, and across multiple sensor vehicles deployed for that mission.

According to example embodiments, data compression can be implemented as part of the sensor 102, as part of the payload computer data processor 213, or as part of the relay terminal 112 on-board the LEO satellite. Data compression reduces the amount of data that needs to be transferred over the LEO to ground-based gateway link (where that link is either accomplished through a GEO communications satellite to a ground-based GEO gateway or directly to a LEO gateway). By way of example, data compression can be exploited in two ways: (i) reduced latency; or (ii) reduced data rate requirement for the relay terminal (allowing for a reduced antenna or power amplifier rating). For example, assuming a compression gain of at least 2, the corresponding delay profile is as follows (e.g., for the parameters specified in the above data pruning examples): the average delay is (0.5*16.67*20/50)=3.33 minutes, which is a reduction from the 4.16 minute average time without compression—then, with data compression and pruning, the average delay reduces to 1.67 minutes. According to example embodiments, the data compression would typically be implemented based on a lossless compression, such as the International Telecommunications Union ITU-T V.44 standard lossless data compression. Further, additional reductions in latency may be achieved by performing lossy image compression (e.g., where, if the LEO satellite sensor is primarily geared towards obtaining information in oceanic regions, then it would be possible to perform lossy image compression in regions other than ocean regions, thereby reducing latency due to queuing delays). In this context, the management agent 213 could be configured to also manage the data compression functions, and, in that manner, control the types of compression applied to different sets of sensor data (e.g., based on relative importance of data collected in one orbit versus other orbits).

In accordance with further example embodiments, priority data tagging may be employed to prioritize sensor data based on such factors as importance and sensitivity to transmission delay, in efforts to reduce queuing delays for the high priority data relative to lower priority data. The data buffering process can be configured to store monitor data in one or more buffers to facilitate the transmission of higher priority data (e.g., data that requires lower latency) before the transmission of buffered data of lower priorities. As one example, multiple buffers can be employed to store data in different buffers based on priority. As a further example, sensor data packets can be ordered or reordered within one or more data buffers based on priority levels. According to one embodiment, the sensor may be configured to set the priority level of monitored data by inserting metadata along with the raw sensor data (e.g., raw image data). The sensor data processing function of the data processor 213 may then tag the respective data packets via a priority indicator included in the packet header specifying the priority of the data contained within the packet payload. Accordingly, based on such data reordering, it is possible to achieve near zero queuing delay in the LEO satellite. Priority tagging may further be utilized to prioritize data processing within the ground segment, whereby the ground-based data processing entities would be configured to process the higher priority data packets ahead of those of lower priorities. In this context, as with the other data collection and processing functions on-board the LEO satellite, the management agent 213 could be configured to manage such priority tagging functions—e.g., providing the necessary information with respect to the desired priority weightings, and, for example, the priority weightings can be defined by the ground-based management server as a dynamically configurable policy, and communicated to the management agent, accordingly.

Further, in accordance with additional example embodiments, data tagging associated with time and location may also be employed. This is especially true in the context of sensor data buffering, and the associated data processing functions such as data pruning, data compression and data re-ordering—whereby, it is important that the ground-based data processing facilities data processing algorithms be aware of the time at which the resulting monitored data (e.g., a scanned image) was obtained and the location from where the data (e.g., the image) was obtained by the respective sensor instrument. For example, data tagging for location and time facilitates appropriate stitching of images by the ground-based data processing facilities. In the context of time-based and location-based data tagging, the management agent 213 could be configured to manage such tagging functions—e.g., providing the necessary information for tagging packets with the respective time and location of the capture of associated instrument data, space and, for example, the frequency for such time and location tagging can be defined by the ground-based management server as a dynamically configurable policy, and communicated to the management agent, accordingly.

According to further example embodiments, as the LEO sensor satellite moves through its orbit, as described above, there will be times when the satellite transitions the relay of sensor data (via GEO communications satellites) from a first ground-based GEO satellite gateway to a second ground-based GEO satellite gateway, and a respective gateway handover is required. Such a transition may occur, for example, based on a transition from a beam or footprint of a first GEO satellite to a beam or footprint of a second GEO satellite, or a transition from a first beam of a GEO satellite to a second beam of the same GEO satellite and the two beams are served by different ground gateways. Alternatively, the transition of the relay of sensor data may occur on a beam to beam basis within the same GEO satellite and the two beams are served by the same ground gateway. Further, according to different example embodiments, (whether a handover occurs from a first beam to a second beam both serviced by the same GEO gateway, or from a first gateway to a second gateway of different GEO satellites or different beams of the same GEO satellite) the handover process may be triggered by either the LEO satellite (e.g., the LEO satellite relay terminal) or may be triggered by the GEO hub/gateway (where, in the case of a handover from a first GEO gateway to a second GEO gateway, the handover would be triggered by the first gateway). The particular implementation as to whether the handover is triggered by the LEO satellite or the GEO gateway may be based on a tradeoff of various advantages and disadvantages of each option. For example, one advantage of a LEO satellite or LEO satellite relay terminal initiated handover is that the GEO Gateway need not store information regarding the best beam or satellite based on LEO location. One disadvantage of the LEO initiated handover, however, is that, if beam configuration of a GEO satellite changes (e.g., is reconfigured), then the LEO satellite will may initiate a handover at an erroneous time. Further, one advantage of a GEO gateway initiated handover is that, because the gateway fully controls the handovers, the gateway can ensure that required resources are available before the handoff procedure is initiated/executed. One disadvantage of the GEO gateway initiated handover, however, is that the GEO gateway must thus maintain the table as to which GEO satellite is best for different LEO positions (e.g., which would enhance complexity over the LEO satellite maintaining a table of preferred GEO satellites over different positions of the LEO's orbit).

In any event, handover is performed on a predictive basis. In that regard, based on the location of the LEO sensor satellite with respect to the known table of GEO satellite coverage areas, the management agent of the LEO satellite (or the current or source GEO gateway) will know when the relay terminal will be required to perform a satellite-to-satellite or beam-to-beam handover process. At these times, the relay terminal 112 of the LEO satellite 101 will be required to transition from communication with the first GEO satellite to communication with the second GEO satellite (or to transition from a first beam of the GEO satellite to a second beam of the same GEO satellite). In other words, similar to a terrestrial cellular terminal being handed off from the covered cell of one cell tower to the covered cell another, communication with the relay terminal of the LEO satellite will be handed off from the coverage beam of the first GEO satellite to the coverage beam of the second GEO satellite.

Figure 5A:
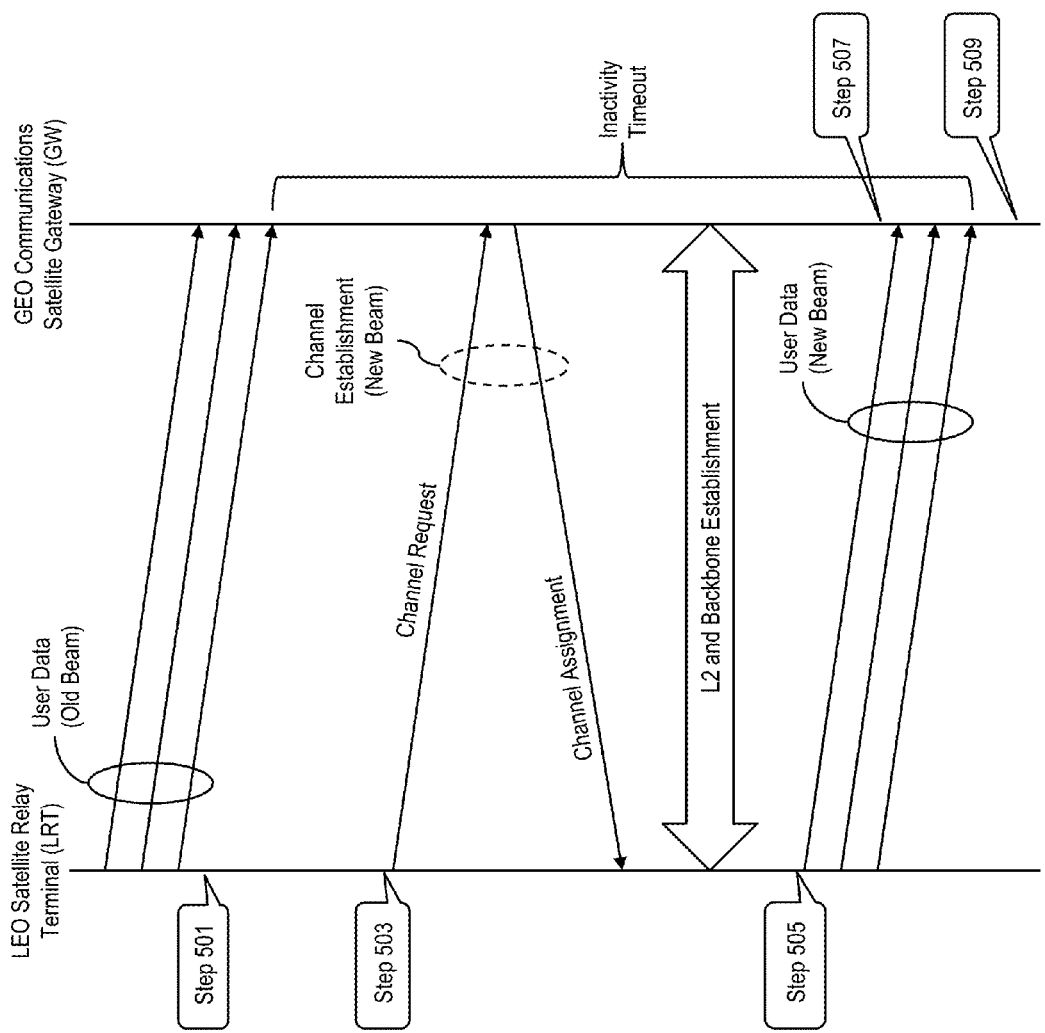
FIG. 5A illustrates a ladder diagram depicting the handover signaling process for a LEO satellite relay terminal handover from a first GEO satellite beam to a second GEO satellite beam (with respect to a single GEO satellite hub/gateway servicing both beams), in the case where the handover is triggered by the LEO satellite relay terminal, in accordance with exemplary embodiments of the present invention.

FIG. 5A illustrates a ladder diagram depicting the handover signaling process for a LEO satellite relay terminal handover from a first GEO satellite beam to a second GEO satellite beam (with respect to a single GEO satellite hub/gateway servicing both beams), in the case where the handover is triggered by the LEO satellite relay terminal, in accordance with exemplary embodiments of the present invention. With reference to FIG. 5A, at Step 501, the relay terminal first determines (e.g., based on LEO satellite position) to switch to a new beam of the current satellite. Then, at Step 503, the relay terminal performs a polarization switch (if necessary), tunes to a new forward channel and establishes a connection in the new satellite beam. By way of example, this may be performed via channel request and channel assignment messaging, as shown in the figure. At this point, at Step 505, the relay terminal begins transmitting the user data via the new beam. Then, at Step 507, the respective gateway establishes a context via the new beam for the particular relay terminal. Further, at Step 509, upon an inactivity timeout within the former beam, the gateway purges the relay terminal context and releases the associated resources within the former beam.

Figure 5B:
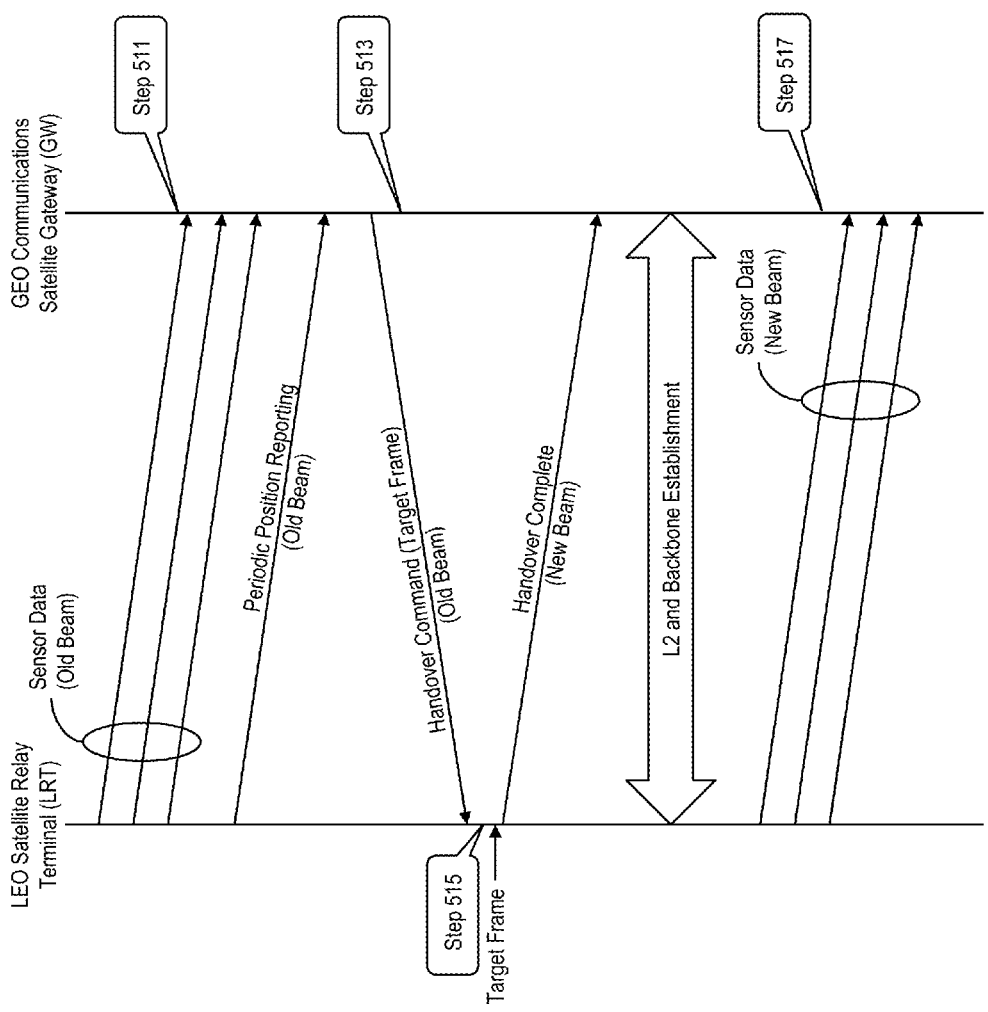
FIG. 5B illustrates a ladder diagram depicting the handover signaling process for a LEO satellite relay terminal handover from a first GEO satellite beam to a second GEO satellite beam (with respect to a single GEO satellite hub/gateway servicing both beams), in the case where the handover is triggered by the GEO satellite gateway, in accordance with exemplary embodiments of the present invention.

FIG. 5B illustrates a ladder diagram depicting the handover signaling process for a LEO satellite relay terminal handover from a first GEO satellite beam to a second GEO satellite beam (with respect to a single GEO satellite hub/gateway servicing both beams), in the case where the handover is triggered by the GEO satellite gateway, in accordance with exemplary embodiments of the present invention. With reference to FIG. 5B, in Step 511, the gateway first determines that a handover is necessary. Upon this determination, the gateway determines resource availability in the new beam, and determines a target handover frame for switching the user data transmission from the old beam to the new beam. Then, at Step 513, the gateway instructs the relay terminal to switch to the determined resources of the new beam at the target frame, and prepares gateway resources for data receipt via a new channel. By way of example, the gateway may transmit a handover command message to the relay terminal, providing the requisite information for the handover to the new beam. In response, at Step 515, at the target frame, the relay terminal performs a polarization switch (if necessary), tunes to a new forward channel and establishes a connection in the new satellite beam. Then, at Step 517, the gateway purges the relay terminal context, releases the associated resources within the former beam and updates the relay terminal context in the new beam.

Figure 5C:
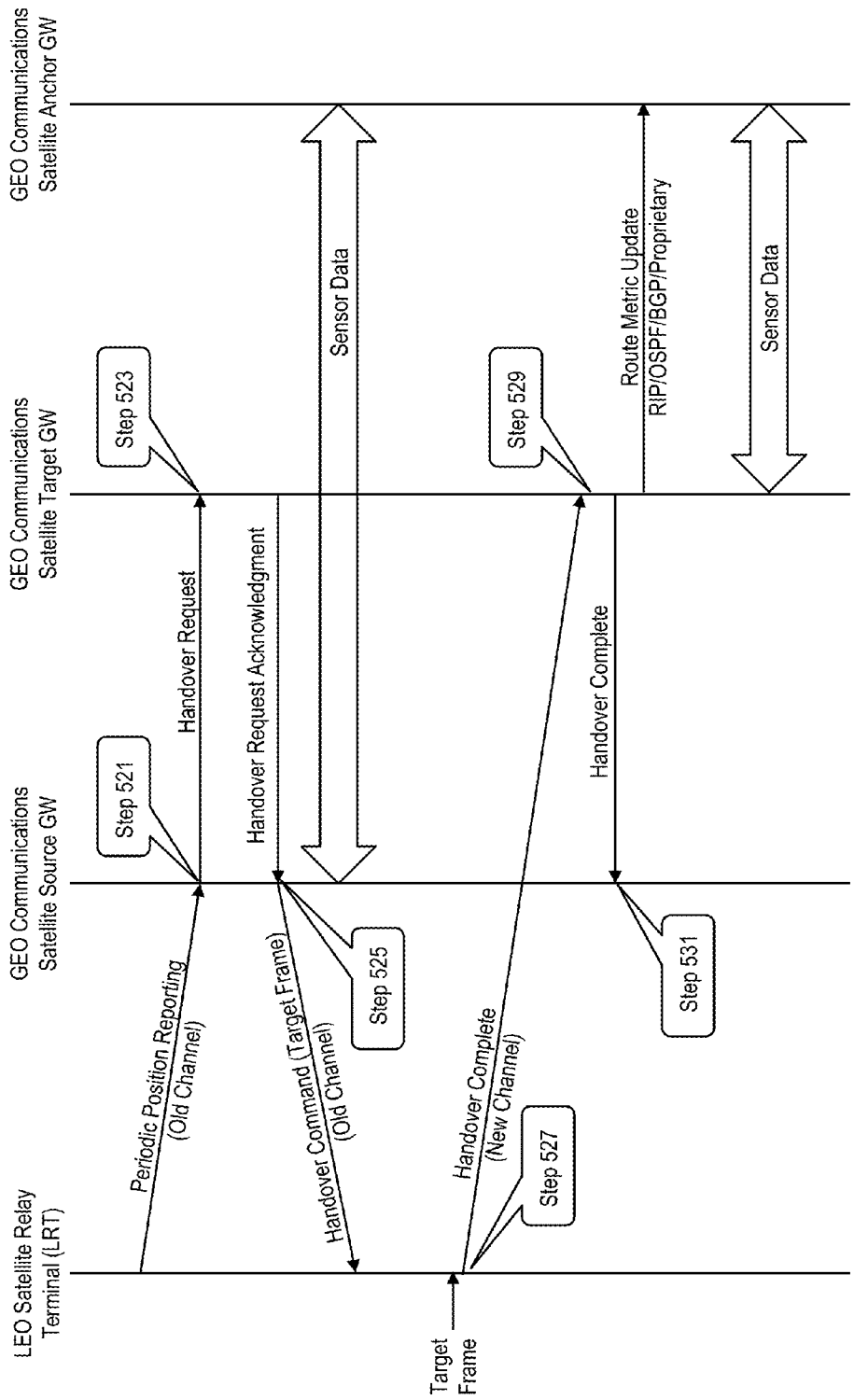
FIG. 5C illustrates a ladder diagram depicting the handover signaling process for a LEO satellite relay terminal handover from a first GEO satellite gateway (a source GEO gateway) to a second GEO satellite gateway (a target GEO gateway), in the case where the handover is triggered by the source GEO communications satellite hub/gateway, in accordance with exemplary embodiments of the present invention.

FIG. 5C illustrates a ladder diagram depicting the handover signaling process for a LEO satellite relay terminal handover from a first GEO satellite gateway (a source GEO gateway) to a second GEO satellite gateway (a target GEO gateway), in the case where the handover is triggered by the source GEO communications satellite hub/gateway, in accordance with exemplary embodiments of the present invention. While, the handover signaling process of FIG. 5C (for a LEO satellite relay terminal handover from a source GEO gateway to a target GEO gateway) may involve either a transition from one GEO satellite to another GEO satellite or a transition between two beams of the same GEO satellite serviced by two different gateways, the depicted signaling process may be utilized in either scenario as the satellites are simply bent pipe relays and are thus the handover between the two gateways is handled between the gateways and the LEO relay terminal without any knowledge or involvement of the satellite(s) involved. With reference to FIG. 5C, at Step 521, the source gateway determines that a gateway handover is required based on location and hysteresis of the LEO satellite relay terminal. Then, at Step 523 the target Gateway determines resource availability in a new channel, determines a target handover frame, and prepares the gateway resources for data receipt via the new channel. By way of example, for Steps 521 and 523, the source gateway may provide a handover request message to the target gateway, and the target gateway may respond with a handover request acknowledgment message, providing the requisite information for the handover (e.g., channel information and target frame identification). At Step 525, the source gateway instructs the relay terminal to switch to the determined resources of the target gateway at the target frame. By way of example, the source gateway may transmit handover command to the relay terminal, providing the requisite handover information (e.g., channel information and target frame). At this point, during the handover process, the source gateway will continue to receive sensor data from the relay terminal until the transition to the new channel of the target gateway is completed. According to an example embodiment, the source gateway may provide the sensor data to an anchor gateway for subsequent provision to the target gateway once the handover process is complete. The target gateway will then be able maintain a complete set of the sensor data despite any handover delay. At Step 527, at the target frame, the relay terminal performs a polarization switch (if necessary), tunes to a new forward channel and establishes a connection in the new satellite beam. Then, at Step 529, the target gateway updates the relay terminal context for the new beam and updates route metrics for data routing to the relay terminal, and the target gateway completes the handover process, for example, by transmitting a handover complete message to the source gateway. Accordingly, at Step 531, the source gateway purges the relay terminal context in the old channel and releases the associated beam resources. Then, at Step 533, the target gateway may provide a route metrics update message to the anchor gateway, and the anchor gateway can then provide the sensor data, collected during the handover process, to the target gateway.

In accordance with example embodiments, in the case of GEO satellite handoff, the management agent 215 commands the antenna control unit 223 to point the tracking antenna 221 to the new GEO satellite beam. While the antenna is being pointed to the new GEO satellite beam, the modem transmissions are ceased to avoid interference with unintended GEO satellites. Further, when the management agent commands a handover to a new GEO satellite, the frequency, symbol rate and polarization (forward and return link) associated with that new GEO satellite is also furnished by the management agent to the modem/router 227. Additionally, when a change in frequency band is required at the time of handover (e.g., from Ku to Ka band, Ka to Ku band, etc.), the management agent would also control the upconverter and downconverter in the LEO satellite. Further, for example, with the implementation of TCP-based communications (TCP being a lossless protocol), the data is lost in the transition periods from one GEO satellite to another. That is to say, at a time where the relay terminal may lose communication with a first GEO satellite to the time it is commanded to switch to the next GEO satellite, some data transmissions may not be received successfully by the first GEO satellite—however, that data will not be lost as it will not be acknowledged and will thus be subsequently retransmitted. Additionally, there may be situations where the LEO satellite is moving through an area where it is cycling between two preferred GEO satellites, but where it would be inefficient for the relay terminal to keep switching back and forth between the two GEO satellites. According to a further embodiment, therefore, the handover process may include a hysteresis whereby the management agent will only command the relay terminal for a transition from the current GEO satellite when the alternate GEO satellite provides for an improvement in link performance beyond a predetermined threshold (e.g., an improvement of 5 dB or greater).

According to further example embodiments, with regard to Doppler correction to accommodate for the speed of the LEO satellite moving through its orbit while communicating with a GEO communications satellite, the management agent 215 would also manage the associated Doppler correction processing. By way of example, the management agent would provide the requisite information to the modem to facilitate removal of Doppler shift prior to baseband processing by the modem. Such Doppler removal by the modem would be based on the a priori knowledge of the LEO satellite position and velocity vector, and a prior knowledge of the GEO satellite position. To facilitate optimal performance, the management agent can be configured to provide updated LEO satellite position and velocity vector information periodically (e.g., once every second). More specifically, the Doppler introduced by a LEO satellite, at an altitude of approximately 800 km, would be on the order of several hundreds of kilohertz, based on the speed and direction of the LEO satellite with respect to the GEO satellite to which it is transmitting (e.g., the speed of a LEO satellite is considerable—the satellite passes through an entire orbit around the earth in approximately 90 minutes). Accordingly, the signal transmitted by the relay terminal is transmitted at some frequency f, but the signal is received by the GEO satellite and relayed down to the GEO gateway at a frequency of f+Δf, where the Δf is based on the Doppler. The modem, therefore, must correct for the introduced Doppler, making the relay terminal appear to the ground-based GEO gateway as a fixed terminal. According to one embodiment, based on the location of the LEO satellite within its orbit, the modem can calculate the amount of Doppler introduced into the satellite channel and the rate of change of Doppler—e.g., the calculation is based on the known location of the LEO satellite, and the known speed and known direction vector with respect to the Geo satellite. The modem thus pre-compensates for the calculated Doppler (accommodating for the Δf shift in frequency introduced by the Doppler). Additionally, the modem further provides timing compensation to accommodate for similarly calculated time shifts due to the movement of the LEO satellite with respect to the GEO satellite with which it is communicating. Moreover, in addition to the pre-compensation performed for the in route transmissions by the relay terminal to the GEO satellite, the modem also apply such frequency and timing compensation to the out route signals received from the ground-based GEO gateway via the respective GEO satellite (e.g., knowing that GEO Gateway is transmitting at a frequency $f_1$, the modem tunes its reception to a frequency close to $f_1+\Delta f_1$ to properly acquire the transmitted signal). In that regard, the modem compensates for Doppler affects in a deterministic manner, as opposed to a closed loop system that would require feedback signaling to adjust for such frequency and timing shifts.

According to additional embodiments, the modem/router 227 of the relay terminal 112 on-board the LEO satellite 101 further performs dynamic link adaptation. By way of example, such dynamic link adaptation is based on adaptive coding and modulation (ACM) schemes to optimize link performance throughout the coverage beam of the respective GEO communications satellite. As the LEO satellite moves through the coverage area of the respective GEO communications satellite, the G/T of the LEO satellite changes (the G/T characterizes satellite or antenna performance, where G reflects the antenna gain in decibels at the receiver frequency and T reflects the equivalent noise temperature of the receiving system—system noise temperature=antenna noise temperature+receiver noise temperature (LNA), and antenna noise temperature is the noise power seen at the receive output of the antenna (to LNA)). For example, the G/T may change as much as 5 to 6 dB from the edge of the GEO satellite coverage area to the center of the coverage area. Accordingly, with the change in G/T, the link condition changes throughout the GEO coverage area, and thus dynamic link adaptation or ACM is applied to optimize the link performance throughout the coverage area.

According to example embodiments, the upper layers of user and the management plane protocol stacks can be implemented in space qualified, radiation hardened general purpose processors, including digital signal processors. The physical layer modem processing can be implemented in space qualified, radiation hardened FPGAs. FPGA implementation of the physical layer processing facilitates employment of software defined radio concepts and permits evolution to future waveforms. According to one embodiment, the physical layer waveforms may include QPSK and its variants, 8-PSK, 16-APSK, 32-APSK and 64-QAM modulation schemes, along with low density parity check (LDPC) coding schemes, including very low rate codes. Other embodiments could include other coding schemes, such as turbo codes, and more complex implementation schemes could include multiple-in-multiple-out (MIMO) and satellite diversity (e.g., with deployment of two tracking antennas on the LEO sensor satellites).

As will be appreciated, a module or component (as referred to herein) may be composed of software component(s), which are stored in a memory or other computer-readable storage medium, and executed by one or more processors or CPUs of the respective devices. As will also be appreciated, a module may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention.

Further, while example embodiments may provide for various implementations (e.g., including hardware, firmware and/or software components), and, unless stated otherwise, all functions are performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof. Moreover, the term "computer-readable medium" as used herein refers to any medium that participates in providing instructions to the processor 403 for execution. Such a medium may take many forms, including but not limited to non-volatile and volatile media. Non-volatile media include, for example, optical or magnetic disks, such as storage device 409. Volatile media may include dynamic memory, such as main memory 405. Common forms of computer-readable media include, for example, a floppy disk, a flexible disk, hard disk, magnetic tape, any other magnetic medium, a CD ROM, CDRW, DVD, any other optical medium, punch cards, paper tape, optical mark sheets, any other physical medium with patterns of holes or other optically recognizable indicia, a RAM, a PROM, and EPROM, a FLASH EPROM, any other memory chip or cartridge, a carrier wave, or any other medium from which a computer can read.

In the preceding specification, various embodiments have been described with reference to the accompanying drawings. It will, however, be evident that various modifications may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A system comprising:
a mobile vehicle platform, including (1) a sensor module configured to monitor one or more of certain conditions, circumstances, environments and situations occurring on or around, or associated with, the Earth, and to generate sensor data resulting from the monitoring, and (2) a relay satellite terminal configured to execute data communications via a communications channel of a first satellite beam, wherein the data communications are configured to relay the sensor data, via one or more satellites with which it executes the data communications, to one or more respective gateways for forwarding to a central processing facility for one or more of aggregation, processing, analysis and dissemination of the data, and wherein the relay satellite terminal is further configured to switch the data communications from the communications channel of the first satellite beam to a communications channel of a second satellite beam;
a first gateway associated with the communications channel of the first satellite beam;
a second gateway associated with the communications channel of the second satellite beam; and
wherein the relay satellite terminal is further configured to transmit periodic position messages to the first gateway,
wherein the first gateway is configured to determine to switch the communications from the communications channel of the first satellite beam to the communications channel of the second satellite beam based on the position messages and a position of the relay satellite terminal relative to the first and second satellite beams, and, upon making that determination, to transmit a handover request message to the second gateway,
wherein the second gateway is configured to transmit a handover acknowledgement message to the first gateway in response to the handover request message,
wherein the first gateway is further configured to transmit a handover command message to the relay satellite terminal upon receipt of the handover acknowledgement message, and
wherein the relay satellite terminal is further configured to, upon receipt of the handover command message, terminate the data communications via the communications channel of the first satellite beam, tune to the communications channel of the second satellite beam in accordance with the handover command message, transmit a handover complete message to the second gateway, and resume the data communications via the communications channel of the second satellite beam, the system further comprising: an anchor gateway; wherein the first gateway is further configured to, upon receiving the handover acknowledgment message from the second gateway, forward the sensor data to the anchor gateway, wherein the second gateway is further configured to, upon receiving the handover compete message from the relay satellite terminal, transmit a handover complete message to the first gateway, and transmit a route update message to the anchor gateway, and wherein the anchor gateway is configured to, upon receiving the route update message from the second gateway, transmit the sensor data forwarded by the first gateway to the second gateway.

2. The system according to claim 1, wherein the mobile vehicle platform further includes a control module and a buffer module, wherein, during a period of time between the termination of the data communications via the communications channel of the first satellite beam and the resumption of the data communications via the communications channel of the second satellite beam, the control module is configured to store the sensor data in the buffer module, and wherein the control module is configured to, upon the resumption of the data communications via the communications channel of the second satellite beam, provide the buffered data to the relay satellite terminal for transmission to the second gateway.

3. The system according to claim 1, wherein, in switching the data communications from the communications channel of the first satellite beam to the communications channel of the second satellite beam, the relay satellite terminal is configured to perform the following functions:

receive a channel handover command message from the first gateway;

terminate the data communications via the communications channel of the first satellite beam;

tune to the communications channel of the second satellite beam in accordance with the handover command message, and transmit a handover complete message to the second gateway; and resume the data communications via the communications channel of the second satellite beam.

4. The system according to claim 3, wherein the mobile vehicle platform further includes a control module and a buffer module, wherein, during a period of time between the termination of the data communications via the communications channel of the first satellite beam and the resumption of the data communications via the communications channel of the second satellite beam, the control module is configured to store the sensor data in the buffer module, and wherein the control module is configured to, upon the resumption of the data communications via the communications channel of the second satellite beam, provide the buffered data to the satellite relay terminal for transmission to the second gateway.

5. A method comprising:

monitoring, via a sensor disposed on a mobile vehicle platform, one or more of certain conditions, circumstances, environments and situations occurring on or around, or associated with, the Earth, while the mobile vehicle platform travels around the Earth;

generating sensor data resulting from the monitoring;

executing data communications, via a relay satellite terminal, over a communications channel of a first satellite beam, wherein the data communications are configured to relay the sensor data, via one or more satellites with which it executes the data communications, to one or more respective gateways for forwarding to a central processing facility for one or more of aggregation, processing, analysis and dissemination of the data; and switching the data communications from the communications channel of the first satellite beam to a communications channel of a second satellite beam based on a position of the relay satellite terminal relative to the first and second satellite beams;

transmitting periodic position messages to a first gateway associated with the communications channel of the first satellite beam;

determining, by the first gateway, to switch the communications from the communications channel of the first satellite beam to the communications channel of the second satellite beam based on the position messages and a position of the relay satellite terminal relative to the first and second satellite beams, and, upon making that determination, transmitting a handover request message to a second gateway associated with the communications channel of the second satellite beam;

transmitting, by the second gateway, a handover acknowledgement message to the first gateway in response to the handover request message;

transmitting, by the first gateway, a handover command message to the relay satellite terminal upon receipt of the handover acknowledgement message;

terminating, by the relay satellite terminal, the data communications via the communications channel of the first satellite beam upon receipt of the handover command message, tuning to the communications channel of the second satellite beam in accordance with the handover command message, transmitting a handover complete message to the second gateway, and resuming the data communications via the communications channel of the second satellite beam; forwarding, by the first gateway, upon receiving the handover acknowledgment message from the second gateway, the sensor data to an anchor gateway; transmitting, by the second gateway, upon receiving the handover compete message from the relay satellite terminal, a handover complete message to the first gateway, and a route update message to the anchor gateway; and transmitting, by the anchor gateway, upon receiving the route update message from the second gateway, the sensor data forwarded by the first gateway to the second gateway.

6. The method according to claim 5, further comprising:

buffering the sensor data during a period of time of the switching of the data communications from the communications channel of the first satellite beam to the communications channel of the second satellite beam.

7. The method according to claim 5, further comprising:

storing the sensor data in a buffer module during a period of time between the termination of the data communications via the communications channel of the first satellite beam and the resumption of the data communications via the communications channel of the second satellite beam; and transmitting the buffered data to the second gateway upon the resumption of the data communications via the communications channel of the second satellite beam.

* * * * *